United States Patent
Yum et al.

(10) Patent No.: US 9,024,716 B2
(45) Date of Patent: *May 5, 2015

(54) MOBILE TERMINAL, OPERATING METHOD THEREOF, AND REFRIGERATOR

(71) Applicant: LG Electronics Inc., Seoul (KR)

(72) Inventors: Kwanho Yum, Seoul (KR); Sangoh Kim, Seoul (KR); Bongmun Jang, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/105,990

(22) Filed: Dec. 13, 2013

(65) Prior Publication Data

US 2014/0102127 A1  Apr. 17, 2014

Related U.S. Application Data

(63) Continuation of application No. 12/776,721, filed on May 10, 2010, now Pat. No. 8,629,753.

(30) Foreign Application Priority Data

May 11, 2009 (KR) .......................... 10-2009-0041006

(51) Int. Cl.
```
F25D 23/00     (2006.01)
F25D 29/00     (2006.01)
G05B 15/02     (2006.01)
G06Q 10/08     (2012.01)
```

(52) U.S. Cl.
CPC ............... *F25D 23/00* (2013.01); *F25D 29/00* (2013.01); *F25D 2400/361* (2013.01); *F25D 2500/06* (2013.01); *F25D 2700/08* (2013.01); *G05B 15/02* (2013.01); *G06Q 10/087* (2013.01)

(58) Field of Classification Search
CPC ................................ F25D 23/00; G05B 15/02
USPC ........ 340/3.1, 3.7, 3.71, 12.22, 12.25; 62/125
See application file for complete search history.

(56) References Cited

U.S. PATENT DOCUMENTS

| | | | |
|---|---|---|---|
| 5,711,160 A | 1/1998 | Namisniak et al. | 62/125 |
| 7,050,991 B2 | 5/2006 | Ogasawara | 705/22 |
| 8,629,753 B2 * | 1/2014 | Yum et al. | 340/3.1 |

(Continued)

FOREIGN PATENT DOCUMENTS

| | | |
|---|---|---|
| CN | 1375674 | 10/2002 |
| CN | 1375674 A | 10/2002 |

(Continued)

OTHER PUBLICATIONS

Russian Office Action issued in Application No. 2011150263, dated May 19, 2014.

(Continued)

*Primary Examiner* — Edwin Holloway, III
(74) *Attorney, Agent, or Firm* — Ked & Associates, LLP

(57) ABSTRACT

A mobile terminal, an operating method thereof, and a refrigerator are disclosed. The operating method of the mobile terminal includes receiving state information of the refrigerator from the refrigerator, displaying the state information of the refrigerator on a screen, and transmitting a control signal based on a control operation to the refrigerator. Therefore, it is possible to readily control the refrigerator using the mobile terminal.

10 Claims, 24 Drawing Sheets

(56) References Cited

U.S. PATENT DOCUMENTS

| | | | |
|---|---|---|---|
| 2001/0010516 A1 | 8/2001 | Roh et al. | 345/169 |
| 2002/0016739 A1 | 2/2002 | Ogasawara | 705/22 |
| 2002/0029575 A1* | 3/2002 | Okamoto | 62/125 |
| 2002/0066279 A1 | 6/2002 | Kiyomatsu | 62/125 |
| 2004/0016243 A1 | 1/2004 | Song et al. | 62/132 |
| 2004/0186596 A1 | 9/2004 | Roh et al. | 700/19 |
| 2006/0174641 A1 | 8/2006 | Liu et al. | 62/246 |
| 2007/0152048 A1 | 7/2007 | Jung et al. | 235/385 |

FOREIGN PATENT DOCUMENTS

| | | |
|---|---|---|
| CN | 1470834 | 1/2004 |
| CN | 1470834 A | 1/2004 |
| JP | 2002-162149 | 6/2002 |
| JP | 2002-188882 | 7/2002 |
| KR | 10-2004-0043727 A | 5/2004 |
| KR | 10-2007-0071420 | 7/2007 |

OTHER PUBLICATIONS

PCT International Search Report issued in Application No. PCT/KR2010/002930, dated Jan. 17, 2011.

U.S. Office Action issued in U.S. Appl. No. 12/776,721, dated Feb. 7, 2013.

U.S. Office Action issued in U.S. Appl. No. 12/776,721, dated Jun. 27, 2013.

U.S. Notice of Allowance issued in U.S. Appl. No. 12/776,721, dated Sep. 12, 2013.

Chinese Office Action issued in Application No. 201080023911.6, dated Aug. 23, 2013.

Russian Office Action issued in application No. 2011150263 dated Sep. 2, 2014.

* cited by examiner

MOBILE TERMINAL, OPERATING METHOD THEREOF, AND REFRIGERATOR

CROSS-REFERENCE TO RELATED APPLICATION

This application is a Continuation of co-pending U.S. patent application Ser. No. 12/776,721, filed on May 10, 2010, which claims priority under 35 U.S.C. §119(a) from Korean Application No. 10-2009-0041006, filed on May 11, 2009, in the Korean Intellectual Property Office, the disclosure of which is incorporated herein by reference.

BACKGROUND OF THE INVENTION

1. Field of the Invention

The present invention relates to a mobile terminal which is capable of readily controlling a refrigerator, an operating method thereof, and a refrigerator.

2. Description of the Related Art

Recently, home network technologies have been developed. A home network signifies a network in which a variety of home appliances are interconnected to enable the user to enjoy a convenient, safe and economical life service at any time inside and outside of a home. With the advance of digital signal processing technologies, refrigerators, washing machines, etc. have been gradually digitized, home appliance operating system technologies and high-speed multimedia communication technologies have been intensively deployed on digital home appliances, and a new type of information home appliance has appeared. Therefore, the home network has been developed still further.

A home network system constructed in a home includes a master device that is an electric appliance capable of controlling the operation of each home appliance or monitoring the state thereof, and one or more home appliances each having a function of responding to a request from the master device and a function of notifying information about a variation in the state thereof However, the construction of the above-mentioned home network system has the inconvenience of having to separately provide a separate master device which is capable of controlling the operation of each home appliance or monitoring the state thereof.

Moreover, in the case where a home appliance is a refrigerator, in order to know which foods there is a shortage of in the refrigerator at any place or time, there is a need to display state information of the refrigerator including kinds and freshness degrees of foods stored in the refrigerator using a mobile terminal.

SUMMARY OF THE INVENTION

Therefore, the present invention has been made in view of the above problems, and it is an object of the present invention to provide a mobile terminal which is capable of readily controlling a refrigerator, an operating method thereof, and a refrigerator.

In accordance with an aspect of the present invention, the above and other objects can be accomplished by the provision of an operating method of a mobile terminal including receiving state information of a refrigerator from the refrigerator, displaying the state information of the refrigerator on a screen, and transmitting a control signal based on a control operation to the refrigerator.

In accordance with another aspect of the present invention, there is provided a mobile terminal for controlling a refrigerator, the mobile terminal including a wireless communication unit for transmitting/receiving data to/from the refrigerator, a controller for generating information about foods stored in the refrigerator based on state information of the refrigerator received from the refrigerator, and a display unit for displaying a menu picture including a refrigerator management menu, and displaying the generated food information on a screen when a food management item in the refrigerator management menu is selected.

In accordance with a further aspect of the present invention, there is provided a refrigerator including a display unit for displaying an operating state of the refrigerator, a wireless communication unit for transmitting/receiving data to/from a mobile terminal, and a controller for controlling the wireless communication unit to transmit information about foods stored in the refrigerator to the mobile terminal.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

Reference will now be made in detail to the preferred embodiments of the present invention, examples of which are illustrated in the accompanying drawings. Wherever possible, the same reference numbers will be used throughout the drawings to refer to the same or like parts. It is to be noted that the suffixes of constituent elements used in the following description, such as "module" and "unit", are simply used by considering the ease of writing this specification, but do not have any particular importance or role. Accordingly, the terms "module" and "unit" can be used interchangeably.

Figure 1:
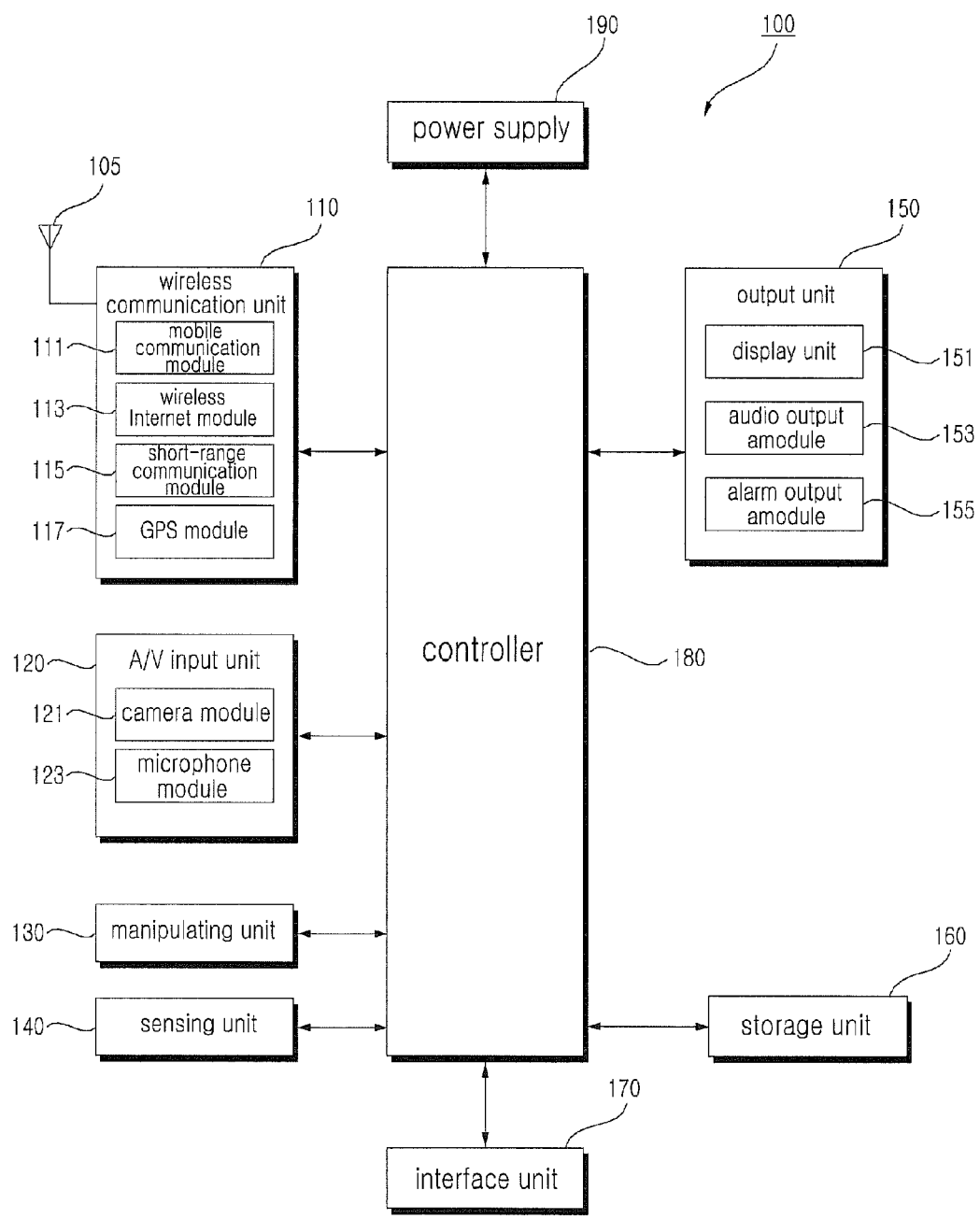
FIG. 1 is a block diagram of a mobile terminal according to an exemplary embodiment of the present invention.

FIG. 1 is a block diagram of a mobile terminal according to an exemplary embodiment of the present invention.

Referring to FIG. 1, a mobile terminal 100 according to the present invention may include a wireless communication unit 110, an audio/video (A/V) input unit 120, a manipulating unit 130, a sensing unit 140, an output unit 150, a storage unit 160, an interface unit 170, a controller 180, and a power supply 190. If necessary, when implemented in actual applications, two or more of these constituent elements may be combined into one constituent element or one thereof may be subdivided into two or more constituent elements.

The wireless communication unit 110 may include a mobile communication module 111, a wireless Internet module 113, a short-range communication module 115, and a global position system (GPS) module 117. radio signals to/from at least one of a base station, an external terminal and a server over a mobile communication network. The radio signals may include a voice call signal, a video telephony call signal or various forms of data based on text/multimedia message transmission/reception.

The wireless Internet module 113 refers to a module for wireless Internet access. This module may be installed inside or outside of the mobile terminal 100.

When a service call menu item is selected, the wireless Internet module 113 may make a connection to a service center and transmit refrigerator diagnosis data to the service center.

The short-range communication module 115 refers to a module for short-range communication. For example, short-range communication technologies may include Bluetooth, radio frequency identification (RFID), infrared data association (IrDA), ultra wideband (UWB), and ZigBee.

Also, the short-range communication module 115 may transmit/receive data to/from a refrigerator using, for example, Bluetooth. In detail, the short-range communication module 115 may receive state information of the refrigerator. The state information of the refrigerator may include at least one of food information, an expiration date of a food, a storage period of the food, a freezing chamber temperature, a refrigerating chamber temperature, an outdoor air temperature, door opening/closing information, operation diagnosis information, and an error content.

The global position system (GPS) module 117 receives location information from a plurality of GPS satellites.

The A/V input unit 120 is configured to input an audio signal or video signal. The A/V input unit 120 may include a camera module 121 and a microphone module 123. The camera module 121 processes frames of a still image or moving image acquired by an image sensor in a video call mode or image capture mode. The processed image frames may be displayed on a display unit 151.

The image frames processed by the camera module 121 may be stored in the storage unit 160 or externally transmitted via the wireless communication unit 110. Two or more camera modules 121 may be provided depending on embodiments of the configuration of the terminal.

Also, if the user captures an image of a food to be stored in a refrigerator through the camera module 121, the mobile terminal 100 may store the captured image in the storage unit 160. Also, the mobile terminal 100 may set and store information about the food, for example, a storage date, an expiration date, etc.

The microphone module 123 receives an external sound signal through a microphone in a call mode, a recording mode, a voice recognition mode, or the like and processes the received sound signal to convert it into electrical audio data. In the call mode, the converted audio data may be converted into that of a format transmittable to a mobile communication base station through the mobile communication module 111 and then outputted to the mobile communication base station. Various noise removal algorithms may be employed in the microphone module 123 to remove noise generated in the course of receiving the external sound signal.

The manipulating unit 130 generates key input data that the user inputs to control the operation of the terminal. The manipulating unit 130 may include a key pad, a dome switch, a touch pad (static pressure/capacitance), a jog wheel, a jog switch, and a finger mouse. In particular, the touch pad and the display unit 151 to be described later may constitute a layered structure, which may be called a touch screen.

The sensing unit 140 senses the current state of the mobile terminal 100, such as the open/closed state of the mobile terminal 100, the location of the mobile terminal 100 or the presence or absence of user contact with the mobile terminal 100, and generates a sense signal for control of the operation of the mobile terminal 100 as a result of the sensing. For example, in the case where the mobile terminal 100 is a slide phone, the sensing unit 140 may sense whether the slide phone is open or closed. Also, the sensing unit 140 may perform a sensing function associated with whether the power supply 190 supplies power or whether the interface unit 170 is coupled with an external device.

The output unit 150 is provided to output an audio signal, a video signal or an alarm signal. To this end, the output unit 150 may include the display unit 151, an audio output module 153, and an alarm output module 155.

The display unit 151 displays and outputs information processed in the mobile terminal 100. For example, when the mobile terminal 100 is in the call mode, the display unit 151 may display a user interface (UI) or graphic user interface (GUI) associated with a call. When the mobile terminal 100 is in the video call mode or image capture mode, the display unit 151 may display captured or received images, respectively or simultaneously, and also displays a UI or GUI.

Also, the display unit 151 displays state information of a refrigerator on a screen. In detail, for the display of the state information of the refrigerator, the display unit 151 may display a menu picture including a refrigerator management menu having a plurality of items and, when any one of the refrigerator management menu items is selected, display a picture corresponding to the selected refrigerator management menu item.

For example, in the case where a food management item is selected, the display unit 151 may arrange and display a plurality of foods in the order of expiration dates or storage periods thereof. Also, the display unit 151 may arrange and display a plurality of foods according to kinds thereof. Also, the display unit 151, when any one of foods stored in the refrigerator is selected, may display at least one of an image, name, current date, storage date, elapsed period, expiration date and barcode information of the selected food.

For example, the display unit 151 may display a list of periods in a first area and display images of one or more foods corresponding to a selected period in the period list in a second area. Also, in the case where any one of the images of the one or more foods displayed in the second area is selected, the display unit 151 may display the selected food image and information about a corresponding food. The food information may include one or more of a name, current date, storage date, elapsed period, expiration date and barcode information. On the other hand, the display unit 151 may display a list of food kinds in the first area and display images of one or more foods corresponding to a selected food kind in the food kind list in the second area.

On the other hand, in the case where a monitoring item is selected, the display unit 151 may display one or more of freezing chamber temperature information, refrigerating chamber temperature information, outdoor air temperature information, door opening/closing information, operation diagnosis information, error content information and a service call item. At this time, if the service call item is selected, the display unit 151 may display a service center connection state picture. Meanwhile, in the case where a software upgrade item is selected, the display unit 151 may display a software upgrade progress picture.

The audio output module 153 outputs audio data received from the wireless communication unit 110 or stored in the storage unit 160 in a call signal reception mode, a call mode, a recording mode, a voice recognition mode, a broadcast reception mode, or the like. The audio output module 153 also outputs sound signals related to particular functions performed by the mobile terminal 100, for example, a call signal reception sound, a message reception sound, etc. This audio output module 153 may include a speaker and a buzzer.

The alarm output module 155 outputs a signal to notify the user of occurrence of an event in the mobile terminal 100. The event occurring in the mobile terminal 100 may be, for example, call signal reception, message reception or key signal input. The alarm output module 155 may also output a signal in any form other than an audio signal or video signal to notify the user of occurrence of an event in the mobile terminal 100. For example, the alarm output module 155 may output a signal in the form of a vibration. When a call signal is received or when a message is received, the alarm output module 155 may output a vibration to notify the user of such a situation. Alternatively, when a key signal is inputted, the alarm output module 155 may output a vibration as a feedback for the key signal input. This vibration output may enable the user to recognize occurrence of an event. Of course, the signal for event occurrence notification may also be outputted through the display unit 151 or audio output module 153.

The storage unit 160 may store programs for processing and control of the controller 180 and may also function to temporarily store input/output data.

The storage unit 160 may include at least one type of storage media including a flash memory type, a hard disk type, a multimedia card micro type, a card type memory (for example, an SD or XD memory), a random access memory (RAM), and a read-only memory (ROM). The mobile terminal 100 may also manage a Web storage that performs the storage function of the storage unit 160 on the Internet.

The interface unit 170 acts as an interface between the mobile terminal 100 and all external devices connected to the mobile terminal 100. The external devices connected to the mobile terminal 100 may include, for example, a wired/wireless headset, an external charger, a wired/wireless data port, a memory card socket, a SIM/UIM card socket, an audio input/output (I/O) terminal, a video I/O terminal, and an earphone. The interface unit 170 may receive data transmitted from the external devices and transfer the received data or power to each internal component of the mobile terminal 100 or transmit internal data of the mobile terminal 100 to the external devices.

The controller 180 typically controls the operation of each of the above-stated components of the mobile terminal 100, so as to control the overall operation of the mobile terminal 100. For example, the controller 180 may perform control and processing associated with a voice call, data communication, and a video call.

Also, the controller 180, when any one item in a refrigerator management menu is selected, controls the display unit 151 to display a picture corresponding to the selected item. Here, the refrigerator management menu may include at least one of a food management item, a monitoring item, a software upgrade item and a remote control item.

For example, in the case where the food management item is selected, the controller 180 may control the display unit 151 to arrange and display a plurality of foods in the order of expiration dates or storage periods thereof. Also, the controller 180 may control the display unit 151 to arrange and display a plurality of foods according to kinds thereof. When any one of foods stored in a refrigerator is selected, the controller 180 may control the display unit 151 to display at least one of an image, name, current date, storage date, elapsed period, expiration date and barcode information of the selected food.

Also, the controller 180 may control the display unit 151 to display a list of periods in a first area of a refrigerator state picture, which displays information about the foods stored in the refrigerator, and display images of one or more foods corresponding to a selected period in the period list in a second area of the refrigerator state picture.

Also, in the case where any one of the images of the one or more foods displayed in the second area is selected, the controller 180 may control the display unit 151 to display the selected food image and information about a corresponding food. Here, the food information may include one or more of a name, current date, storage date, elapsed period, expiration date and barcode information.

Also, in the case where the monitoring item is selected, the controller 180 may control the display unit 151 to display one or more of freezing chamber temperature information, refrigerating chamber temperature information, outdoor air temperature information, door opening/closing information, operation diagnosis information, error content information and a service call item.

At this time, if the service call item is selected, the controller 180 may make a connection to a service center server and transmit refrigerator diagnosis data to the service center server. Also, in this case, the controller 180 may control the display unit 251 to display a service center connection state picture.

Also, in the case where the software upgrade item is selected, the controller 180 may control the display unit 151 to display a software upgrade progress picture. Also, the controller 180 may transmit and upload upgraded software to the refrigerator.

Also, in the case where the remote control item is selected, the controller 180 may transmit a refrigerator control signal inputted by the user to the refrigerator.

In this case, when the remote control item is selected, the controller 180 may display a refrigerator remote control picture through the display unit 151 and, when any one of refrigerator control items displayed in the remote control picture is selected, transmit a corresponding refrigerator control signal to the refrigerator.

The power supply 190, under the control of the controller 180, receives external power or internal power and supplies power necessary for the operation of each constituent element.

The constituent elements of the mobile terminal related to the present invention have been described in terms of the functionality of the mobile terminal. Hereinafter, the constituent elements of the mobile terminal related to the present invention will be described in detail in terms of the outer appearance of the mobile terminal with reference to FIGS. 2 and 3. For convenience of description, in the following description, it will be assumed that the mobile terminal is a mobile terminal of a bar type including a front touch screen, among mobile terminals of various types including a folder type, the bar type, a swing type and a slide type. However, it will be understood that the present invention is not limited to the bar type mobile terminal, but may be applied to mobile terminals of all types including the aforementioned types.

Figure 2:
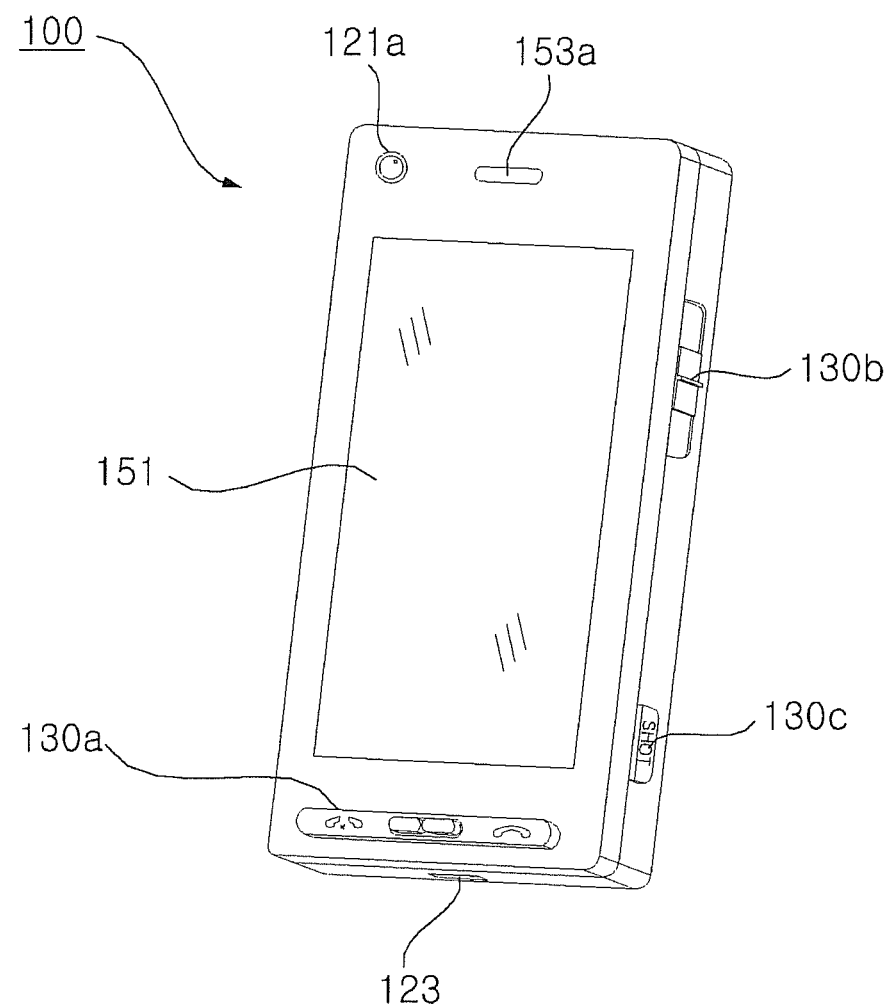
FIG. 2 is a front perspective view of a mobile terminal according to one embodiment of the present invention.

FIG. 2 is a front perspective view of a mobile terminal according to one embodiment of the present invention. Referring to FIG. 2, a case constituting the outer appearance of the mobile terminal 100 is formed by a front case and a rear case. A variety of electronic components are built in a space defined by the front case and the rear case. At least one intermediate case may be additionally disposed between the front case and the rear case.

The display unit 151, a first audio output module 153a, a first camera module 121a, and a first manipulating unit 130a may be disposed in a body, more particularly the front case. A second manipulating unit 130b, a third manipulating unit 130c, and the microphone module 123 may be disposed on side surfaces of the rear case.

The display unit 151 may include a liquid crystal display (LCD), an organic light emitting diode (OLED) display, or the like to visually express information. A touch pad may be overlaid on the display unit 151 in a layered manner, so that the display unit 151 may operate as a touch screen to enable the input of information by the user's touch.

The first audio output module 153a may be implemented in the form of a receiver or speaker. The first camera module 121a may be implemented appropriately to capture an image of the user or the like or a moving image. The microphone module 123 may be implemented in an appropriate form to input the user's voice or other sounds.

The first to third manipulating units 130a, 130b and 130c may be collectively referred to as a 'manipulating portion', which is the manipulating unit 130, and may adopt any method as long as it has a tactile manner that allows the user to manipulate the manipulating units 130a, 130b and 130c while receiving tactile feedback.

For example, the manipulating unit 130 may be implemented with a dome switch or touch pad that can input a command or information by the user's pushing or touching or implemented in a wheel or jog scheme in which a key is rotated or in a joystick scheme. In terms of functionality, the first manipulating unit 130a may input commands such as START, END and SEND, and the second manipulating unit 130b may input operation mode selection, etc. The third manipulating unit 130c may operate as a hot-key to activate a special function in the mobile terminal 100.

Figure 3:
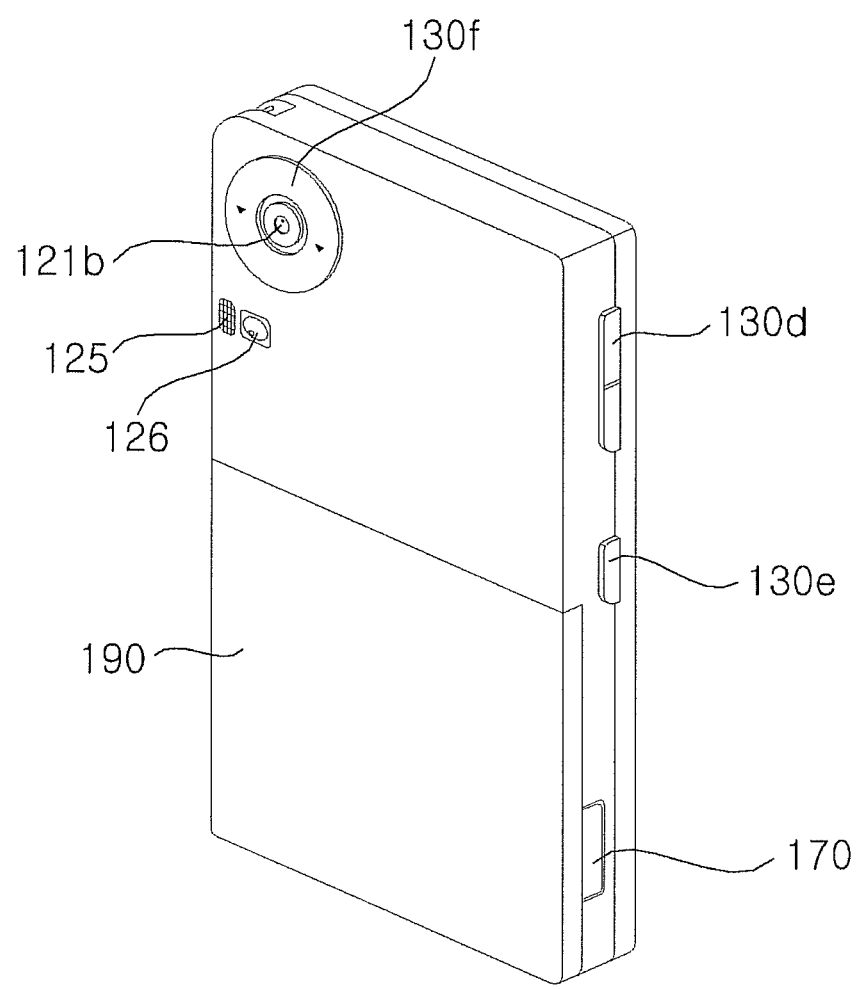
FIG. 3 is a rear perspective view of the mobile terminal shown in FIG. 2.

FIG. 3 is a rear perspective view of the mobile terminal shown in FIG. 2. Referring to FIG. 3, a fourth manipulating unit 130d, a fifth manipulating unit 130e, and the interface unit 170 may be disposed on a side surface of the rear case, and a second camera module 121b may be additionally mounted on a rear surface of the rear case.

The second camera module 121b may have an image capturing direction substantially opposite to that of the first camera module 121a and a different number of pixels from that of the first camera module 121a. For example, the first camera module 121a may have a low pixel density not to be too extreme to capture an image of the user's face and transmit the captured image to another party, in the case of a video call or the like, and the second camera module 121b may have a high pixel density in that an image of a general subject is sometimes not transmitted immediately after being captured.

A sixth manipulating unit 130f may be installed around the second camera module 121b. A jog wheel or the like capable of performing rotational input may be employed as the sixth manipulating unit 130f.

A flash 125 and a mirror 126 may be additionally disposed adjacent to the second camera module 121b. The flash 125 irradiates light to a subject when an image of the subject is captured by the second camera module 121b. The mirror 126 enables the user to see his/her face, etc. reflected thereon when intending to capture an image of himself/herself using the second camera module 121b (self-portrait).

A second audio output module (not shown) may be additionally disposed in the rear case. The second audio output module may implement a stereo function with the first audio output module 153a and may be used for a call in a speakerphone mode.

An antenna (not shown) for reception of broadcast signals may be further disposed at one side of the rear case in addition to an antenna for calls. The broadcast signal reception antenna may be installed to be extractable from the rear case.

The interface unit 170 acts as a passage for data exchange, etc. between the mobile terminal 100 and external devices connected to the mobile terminal 100. For example, the interface unit 170 may include at least one of a connection terminal for wired/wireless connection to an earphone, a port for short-range communication, and a power supply terminal for supply of power to the mobile terminal 100. Also, the interface unit 170 may include a card socket for receiving an external card, such as a subscriber identification module (SIM) card, a user identity module (UIM) card or a memory card for storage of information.

The power supply 190 is mounted in the rear case to supply power to the mobile terminal 100. The power supply 190 may be, for example, a rechargeable battery, which may be detachably mounted in the rear case for charging, etc.

The mobile terminal described in this specification may include, for example, a mobile phone, a smart phone, a notebook computer, a digital broadcasting terminal, a personal digital assistant (PDA), a portable multimedia player (PMP), or the like.

Figure 4:
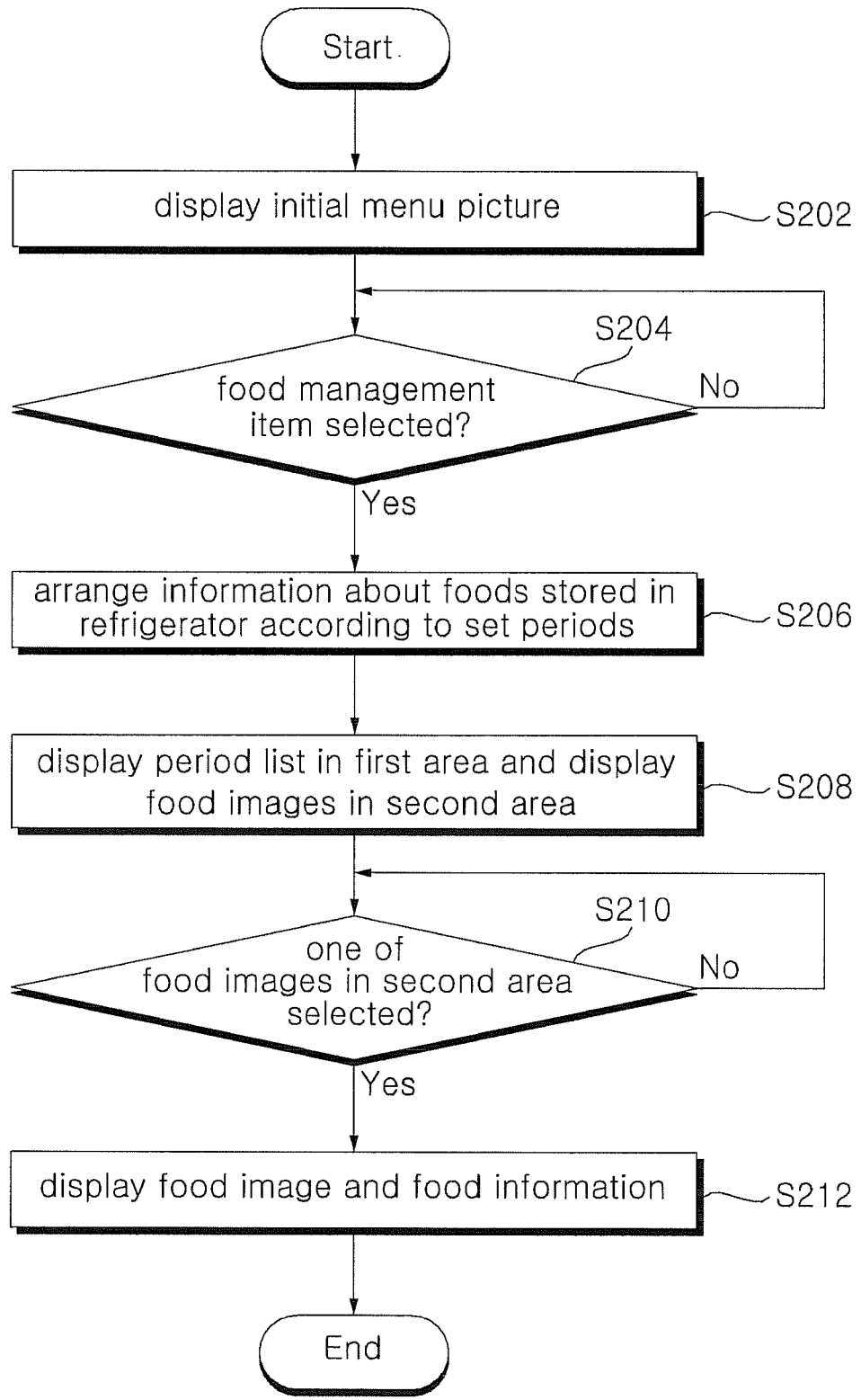
FIG. 4 is a flow chart illustrating a method for displaying information about foods stored in a refrigerator using a mobile terminal, according to one embodiment of the present invention.
Figure 6:
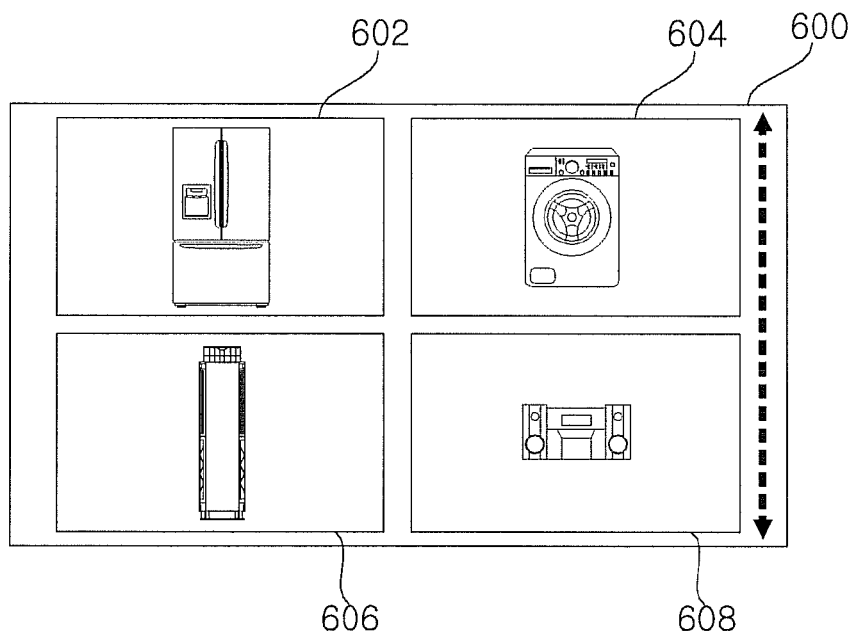
FIGS. 6 to 16 are screen diagrams illustrating exemplary embodiments of the present invention.
Figure 7:
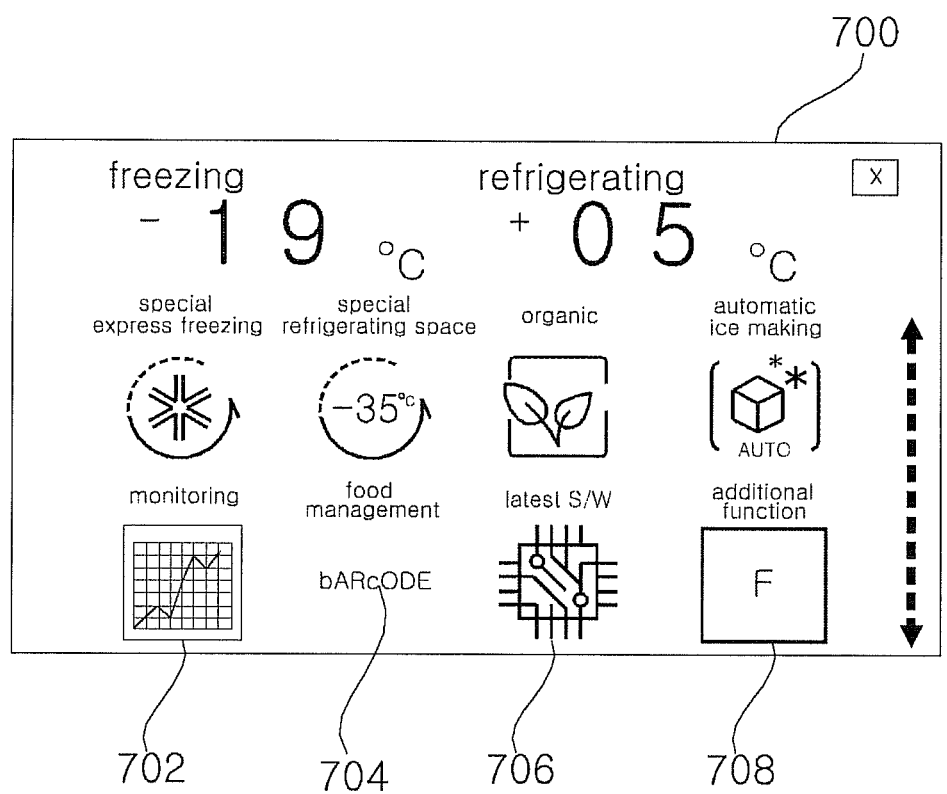
Figure 8:
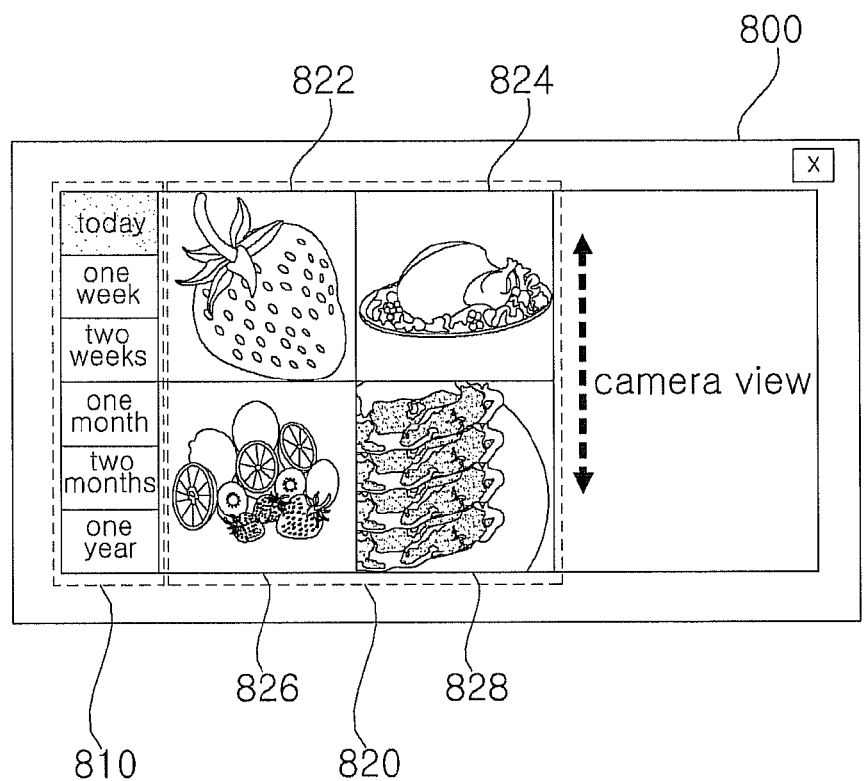
Figure 9:
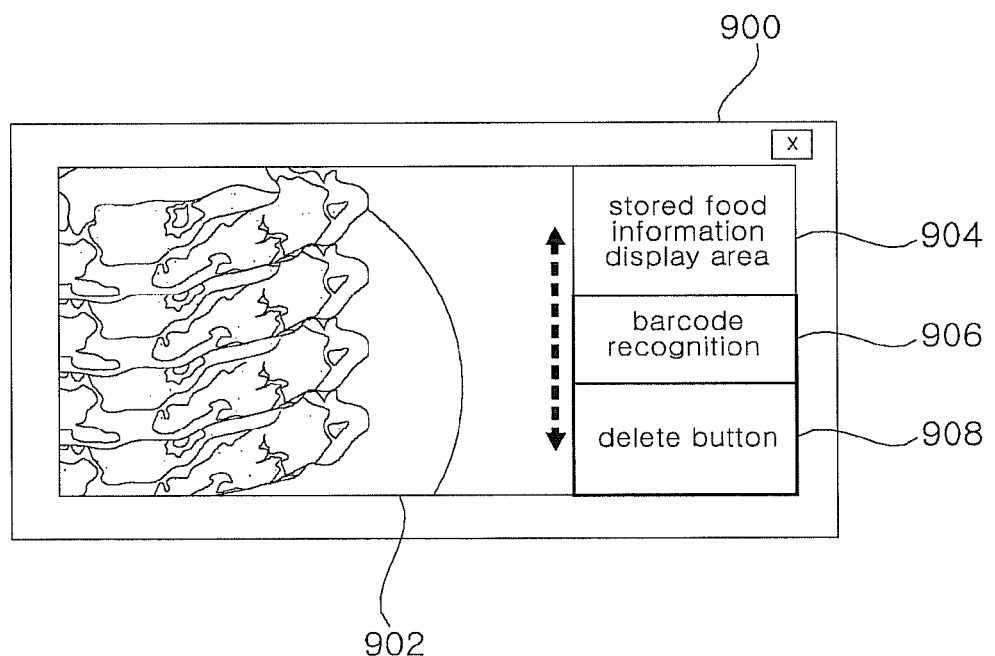
Figure 10A:
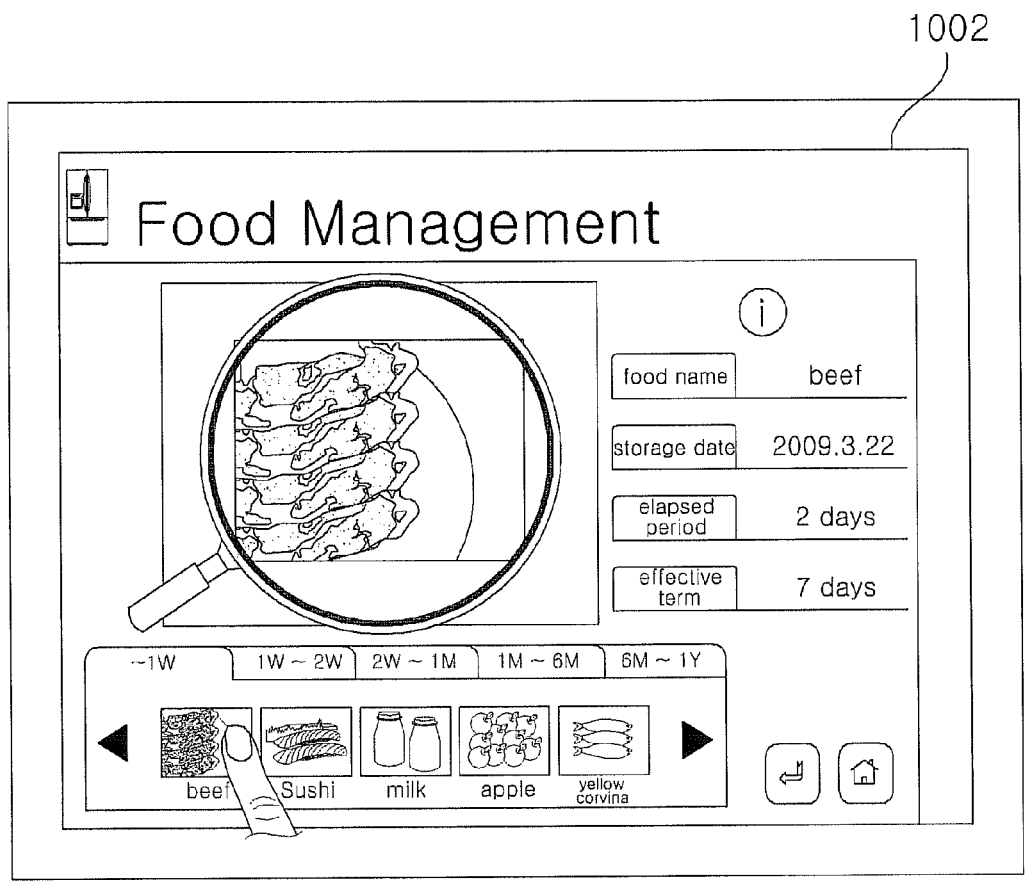
Figure 10B:
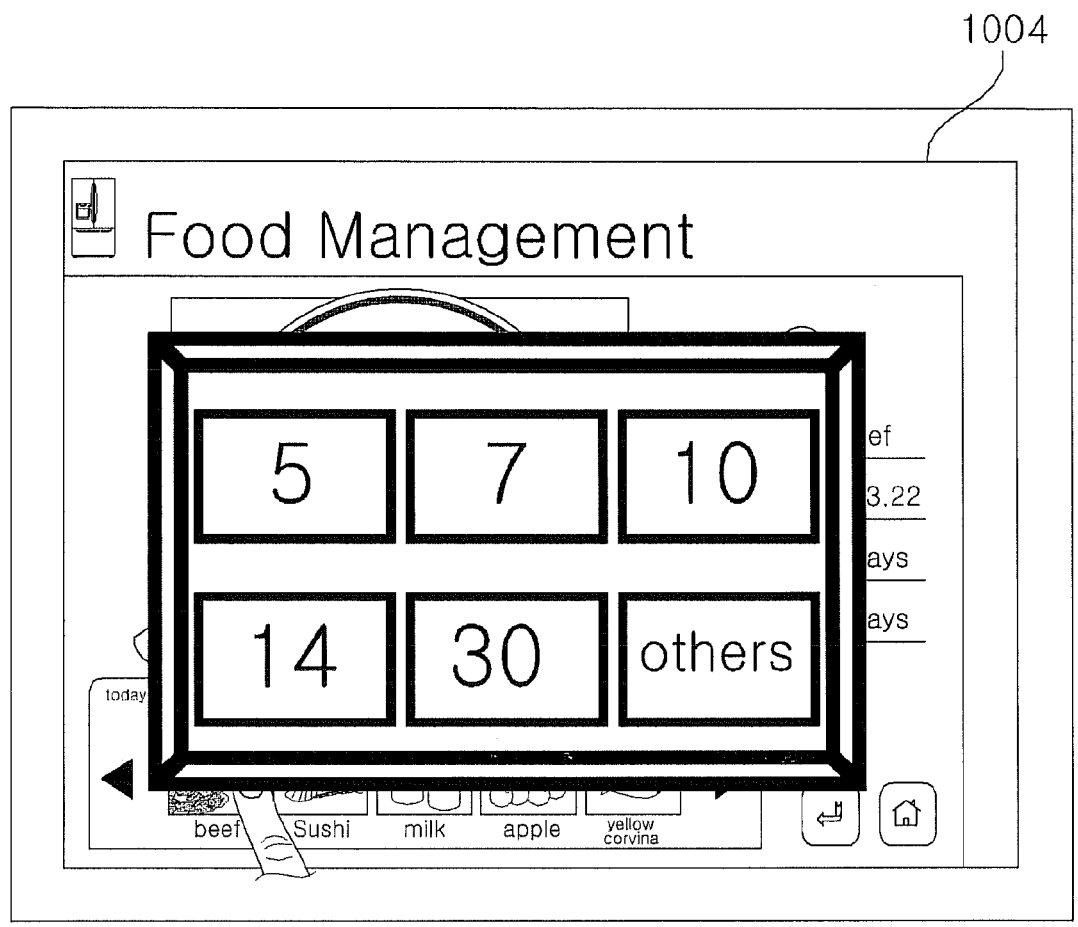
Figure 10C:
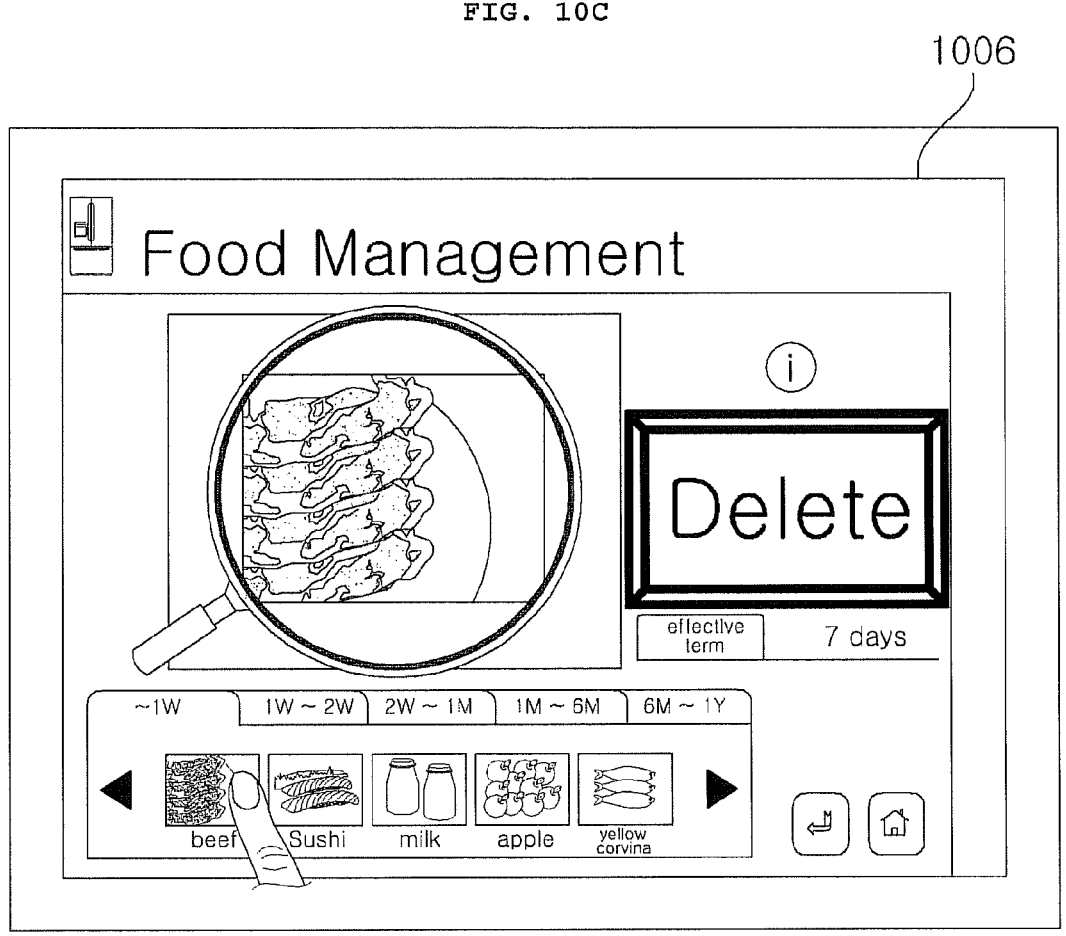
Figure 11A:
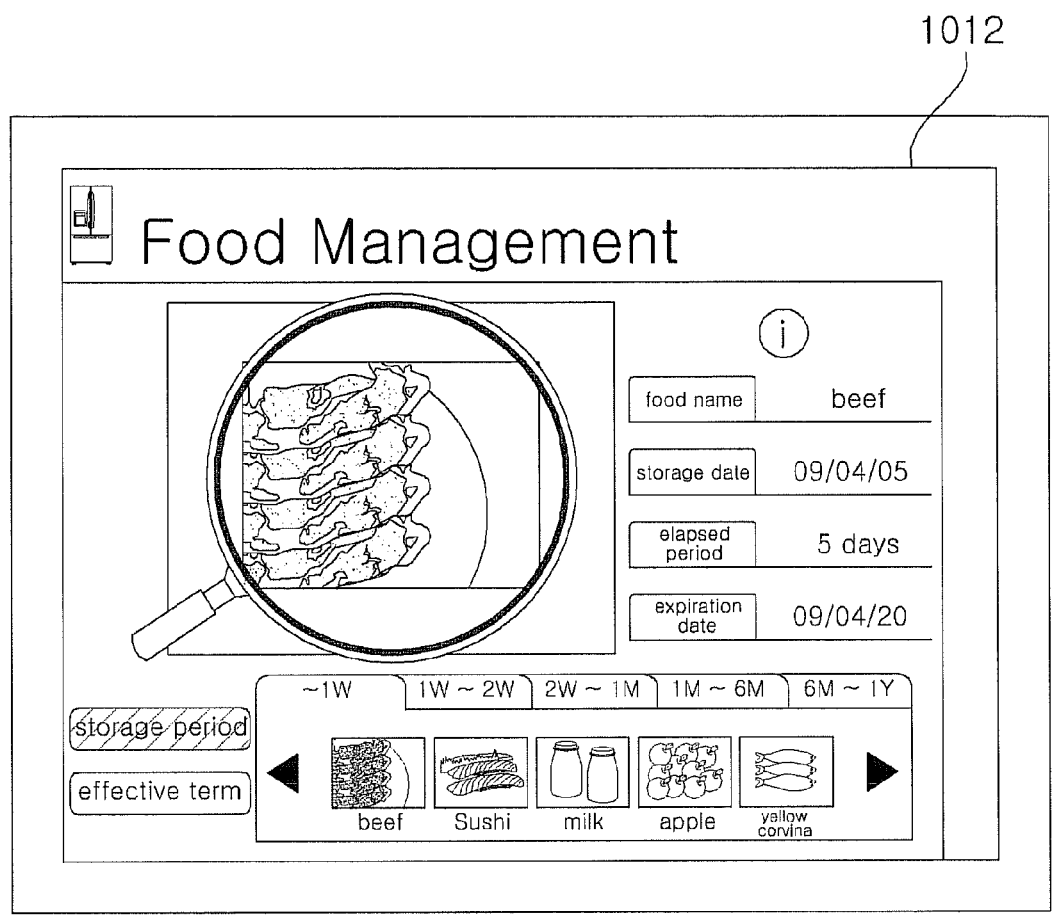
Figure 11B:
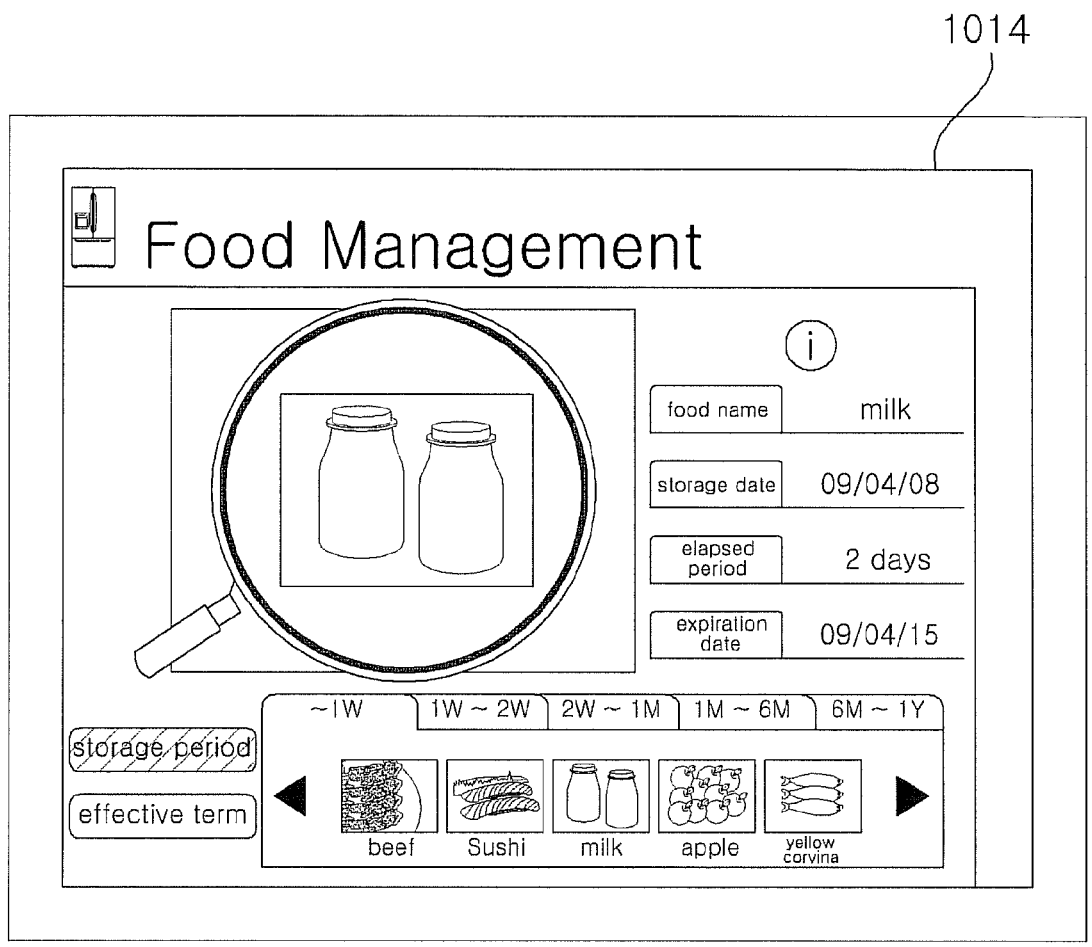
Figure 11C:
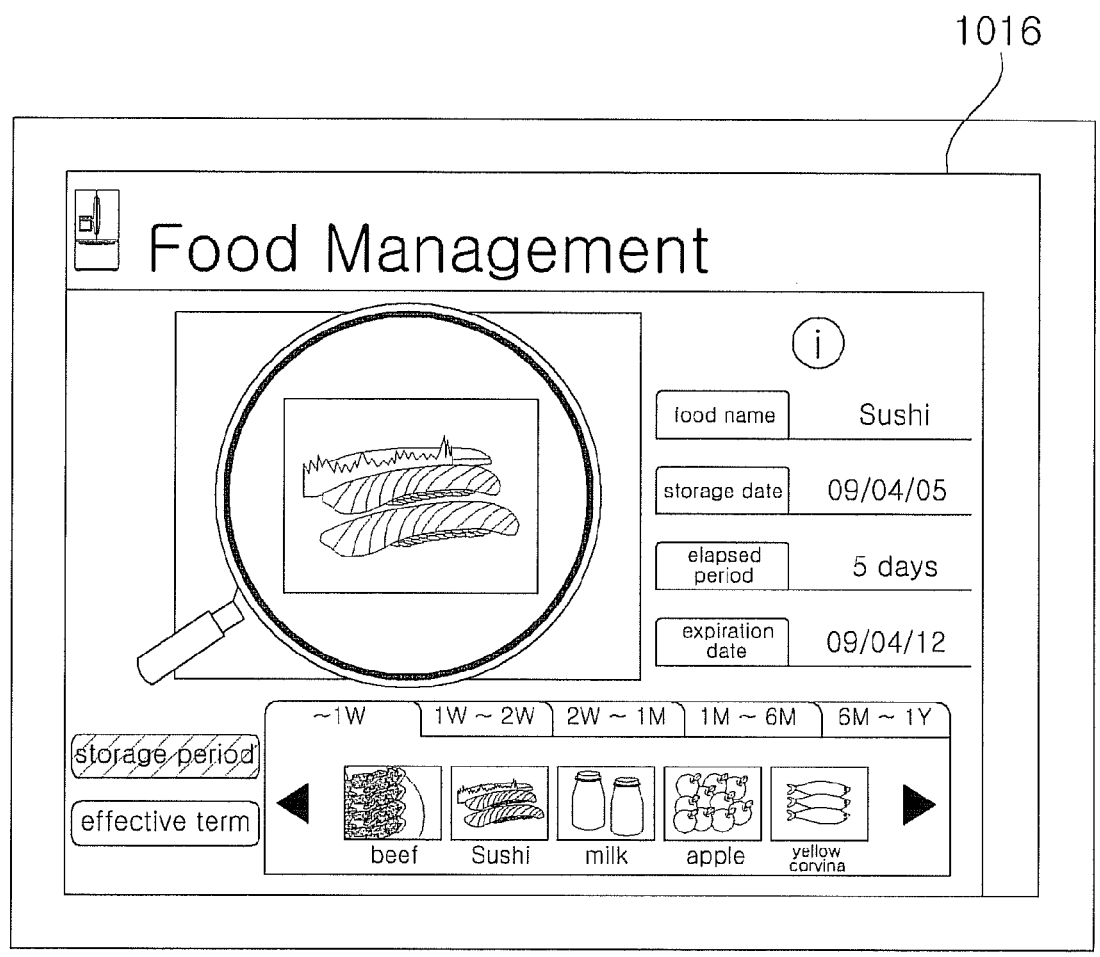
Figure 11D:
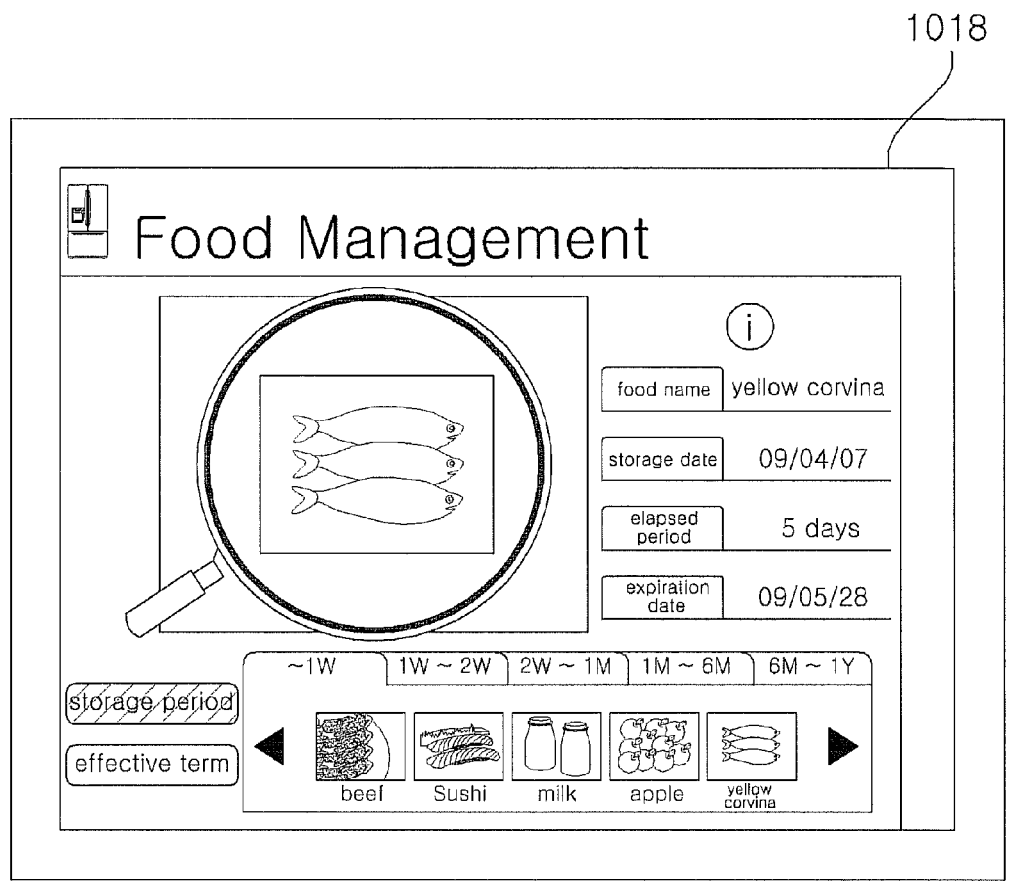
Figure 11E:
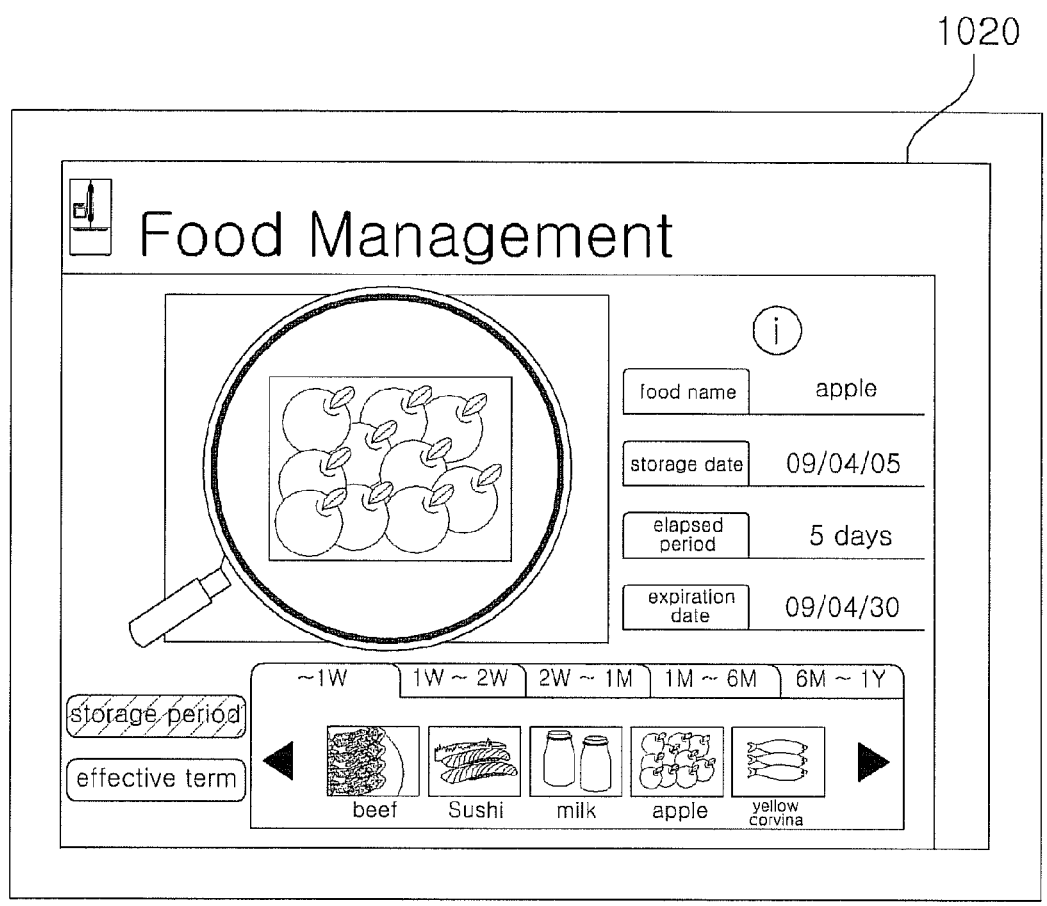
Figure 11F:
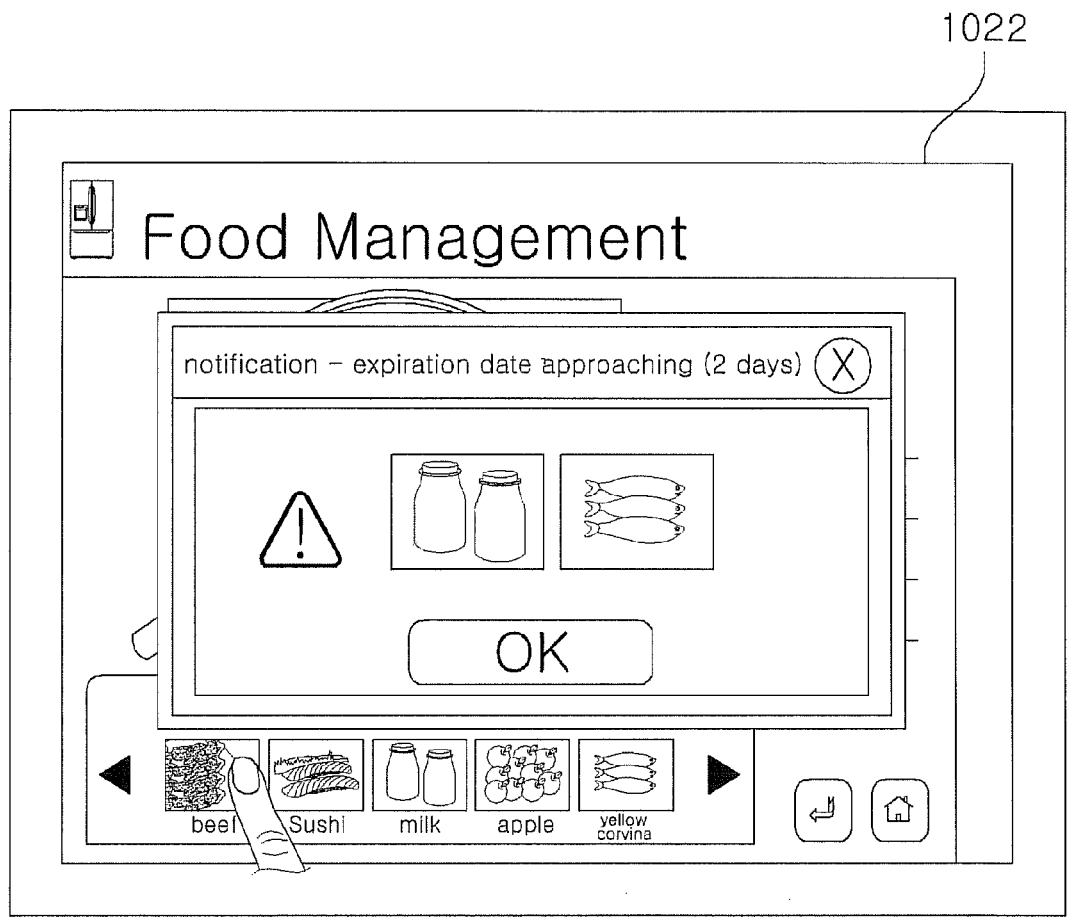
Figure 11G:
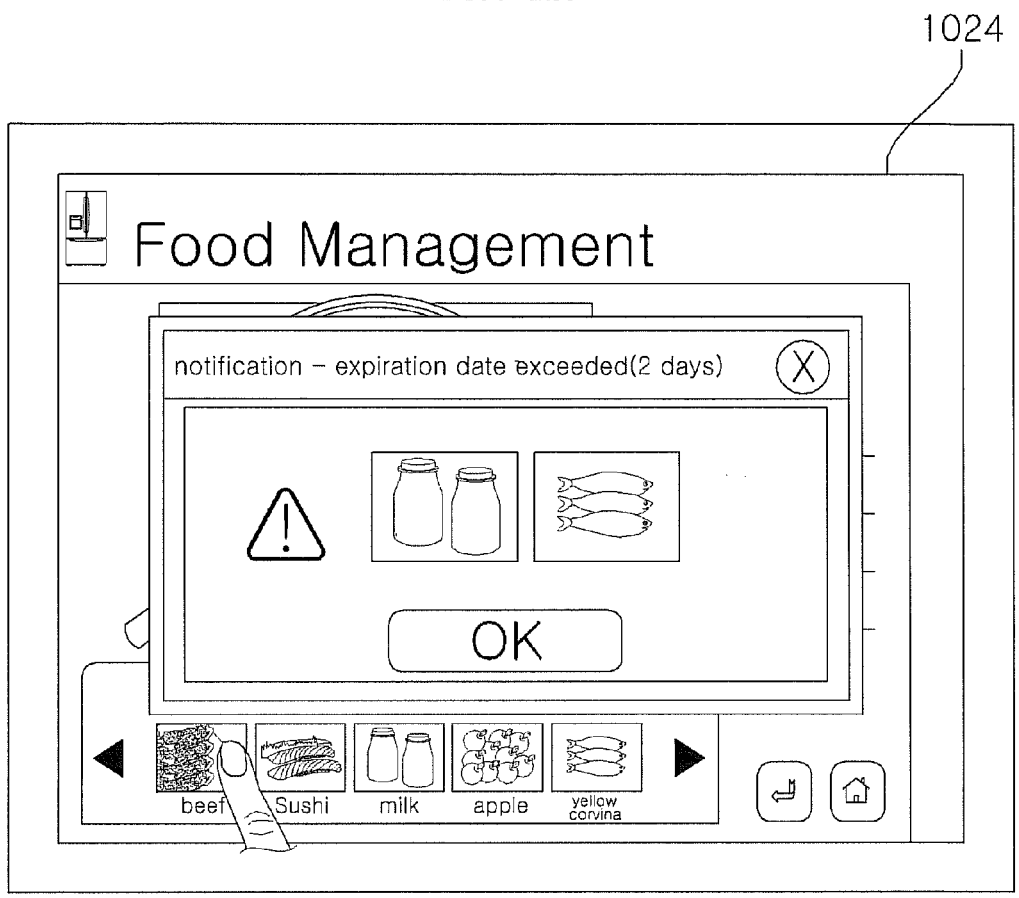
Figure 12A:
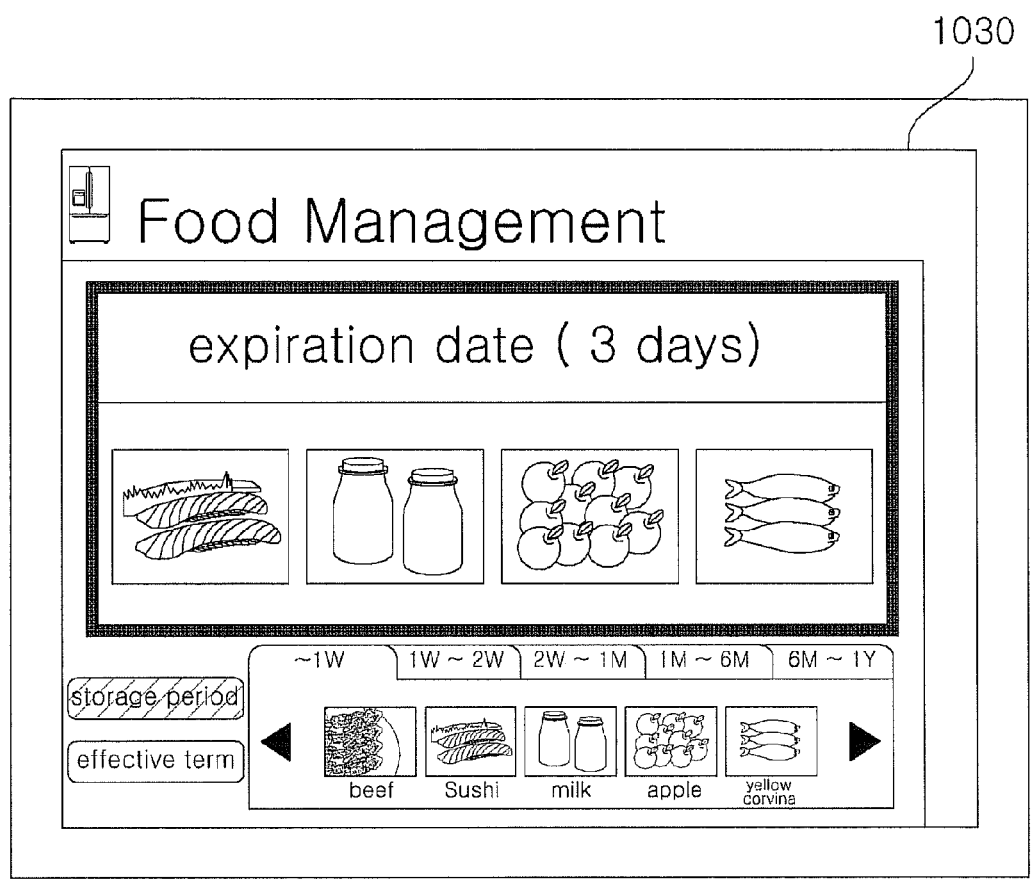
Figure 12B:
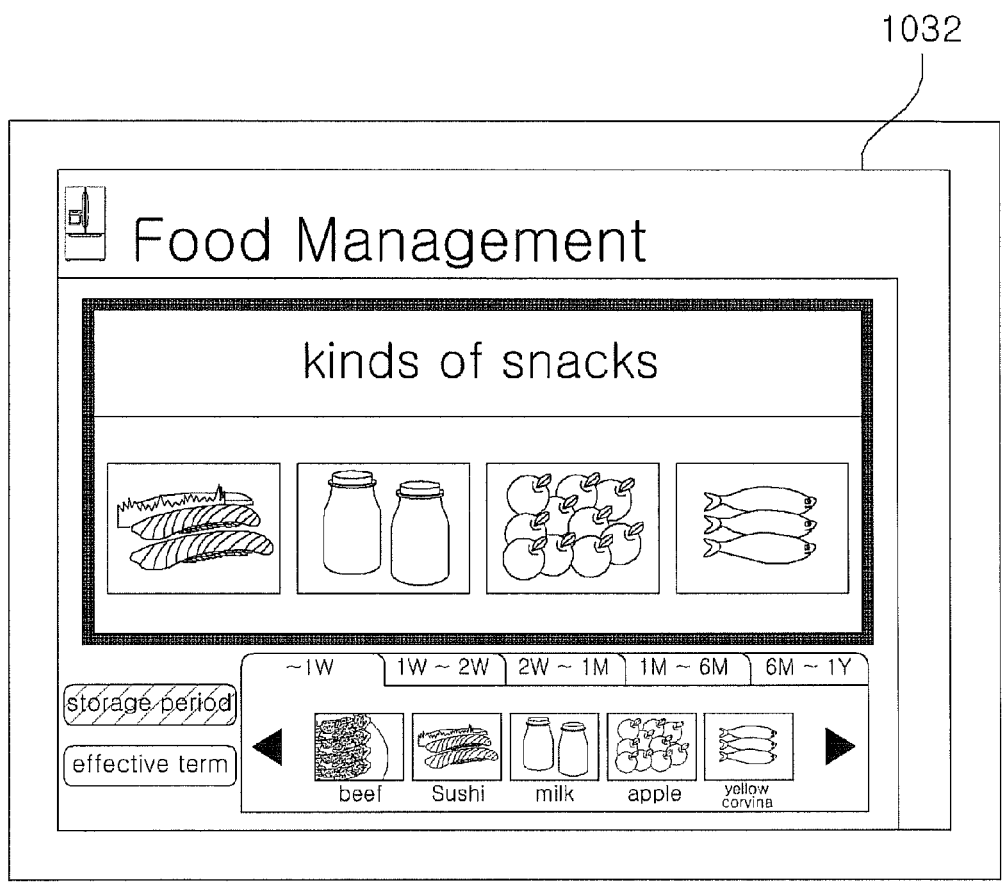

FIG. 4 is a flow chart illustrating a method for displaying information about foods stored in a refrigerator using a mobile terminal, according to one embodiment of the present invention. Also, FIG. 6 illustrates a home appliance selection picture according to the present invention, FIG. 7 illustrates a menu picture according to the present invention, FIG. 8 illustrates a refrigerator state picture according to the present invention, and FIG. 9 illustrates a food management picture according to the present invention. Also, FIG. 10A illustrates a food image capture picture according to the present invention, FIG. 10B illustrates an effective term selection picture according to the present invention, and FIG. 10C illustrates a food image delete picture according to the present invention. Also, FIG. 11A illustrates a foods-by-storage periods picture according to one embodiment of the present invention, FIG. 11B illustrates a foods-by-storage periods picture according to another embodiment of the present invention, and FIG. 11C illustrates a foods-by-storage periods picture according to a further embodiment of the present invention. Also, FIG. 11D illustrates a foods-by-effective terms picture according to one embodiment of the present invention, and FIG. 11E illustrates a foods-by-effective terms picture according to another embodiment of the present invention. Also, FIG. 11F illustrates an 'expiration date approaching' notification picture according to the present invention, and FIG. 11G illustrates an 'expiration date exceeded' notification picture according to the present invention. Also, FIG. 12A illustrates a shopping list picture according to the present invention, and FIG. 12B illustrates a recommended snack list picture according to the present invention.

Referring to FIG. 4, the mobile terminal according to the present invention may display a home appliance selection picture 600 including one or more home appliance areas 602, 604, 606 and 608 shown in FIG. 6. At this time, if the user selects a specific home appliance (for example, a refrigerator) area, namely, the home appliance area 602, the mobile terminal displays an initial menu picture 700 shown in FIG. 7 (S202). At this time, the initial menu picture 700 may include a monitoring item 702, a food management item 704, a software upgrade item 706, and an additional function item 708. The additional function item may be a remote control item.

Also, the mobile terminal determines whether the food management item is selected (S204), and arranges information about foods stored in the refrigerator according to set periods if the food management item is selected (S206).

On the other hand, the mobile terminal may display a refrigerator state picture 800 including a first area 810 for displaying a list of periods, and a second area 820 for displaying one or more food images 822, 824, 826 and 828, as shown in FIG. 8 (S208).

Also, the mobile terminal determines whether any one of the food images in the second area 820 is selected (S210), and, if any one of the food images is selected, displays the selected food image and information about a corresponding food by displaying a food management picture 900 including a food image area 902, a stored food information display area 904, a barcode recognition area 906, and a delete button 908, as shown in FIG. 9 (S212).

On the other hand, the mobile terminal may capture and store images of foods stored in the refrigerator through a food image capture picture 1002 shown in FIG. 10a, select effective terms through an effective term selection picture 1004 shown in FIG. 10B, and when he/she removes a food from the refrigerator, delete information about the food through a food image delete picture 1006 shown in FIG. 10C.

Also, the mobile terminal may display, for example, a first foods-by-storage periods picture 1012 shown in FIG. 11A, a second foods-by-storage periods picture 1014 shown in FIG. 11B, and a third foods-by-storage periods picture 1016 shown in FIG. 11C.

Also, the mobile terminal may display, for example, a first foods-by-effective terms picture 1018 shown in FIG. 11D, and a second foods-by-effective terms picture 1020 shown in FIG. 11E.

Also, the mobile terminal may display an 'expiration date approaching' notification picture 1022 shown in FIG. 11F, and an 'expiration date exceeded' notification picture 1024 shown in FIG. 11G. Also, the mobile terminal may display a shopping list picture 1030 shown in FIG. 12A, and a recommended snack list picture 1032 shown in FIG. 12B.

Figure 13:
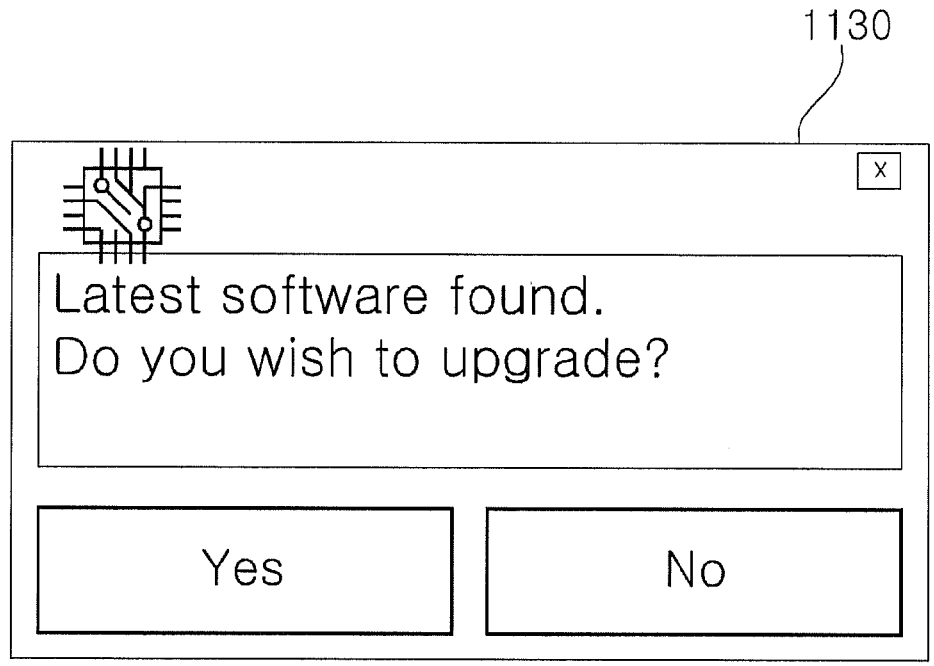

FIG. 13 illustrates a software upgrade picture according to the present invention.

Referring to FIG. 13, when the software upgrade item is selected, the mobile terminal displays a software upgrade selection picture 1130 shown in FIG. 13. At this time, if software upgrade is selected through the software upgrade selection picture 1130, the mobile terminal displays a software upgrade progress picture (not shown). Thereafter, if the software upgrade is completed, the mobile terminal displays a software upgrade end picture (not shown).

Figure 5:
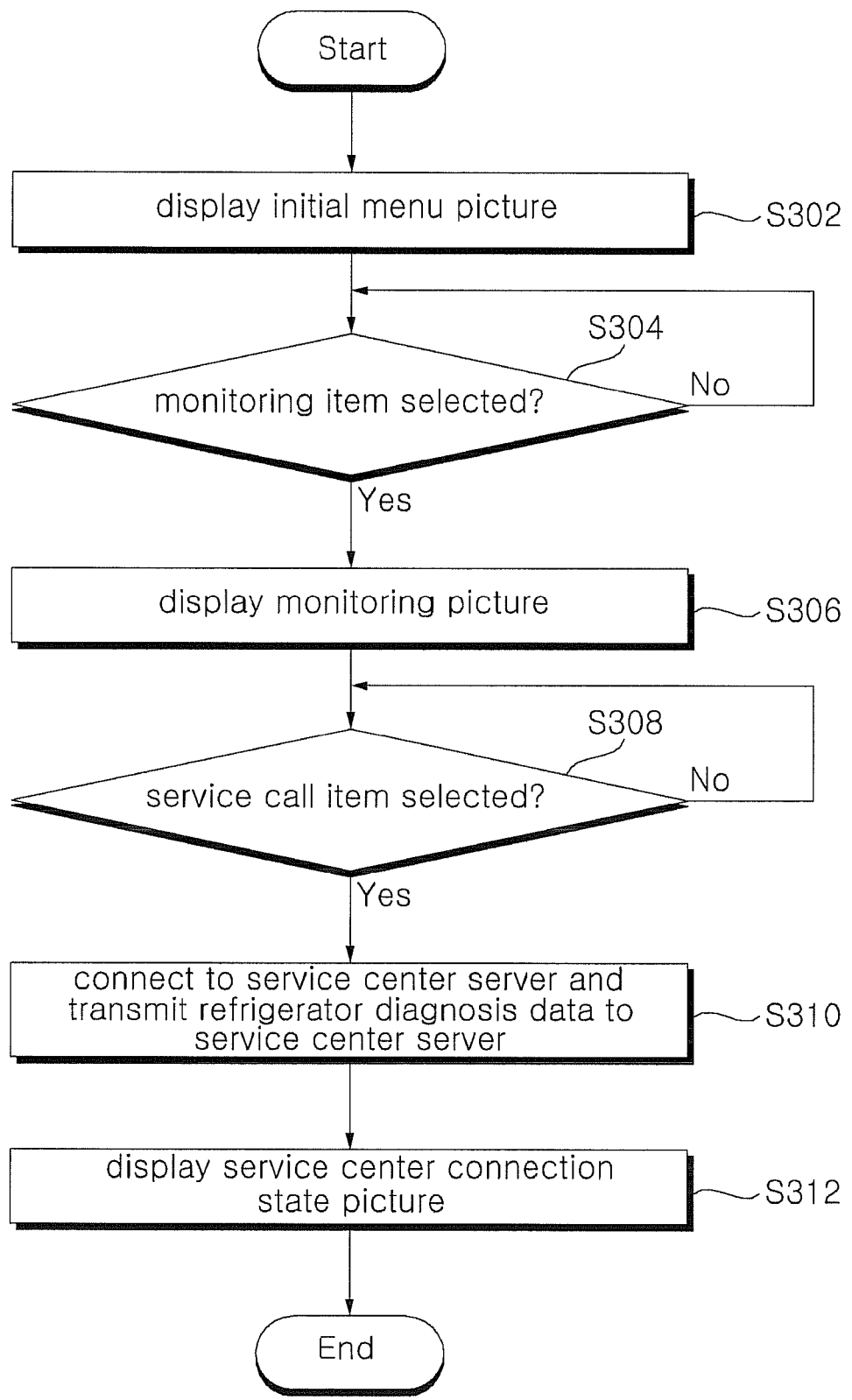
FIG. 5 is a flow chart illustrating a method for monitoring a refrigerator using a mobile terminal, according to one embodiment of the present invention.
Figure 14:
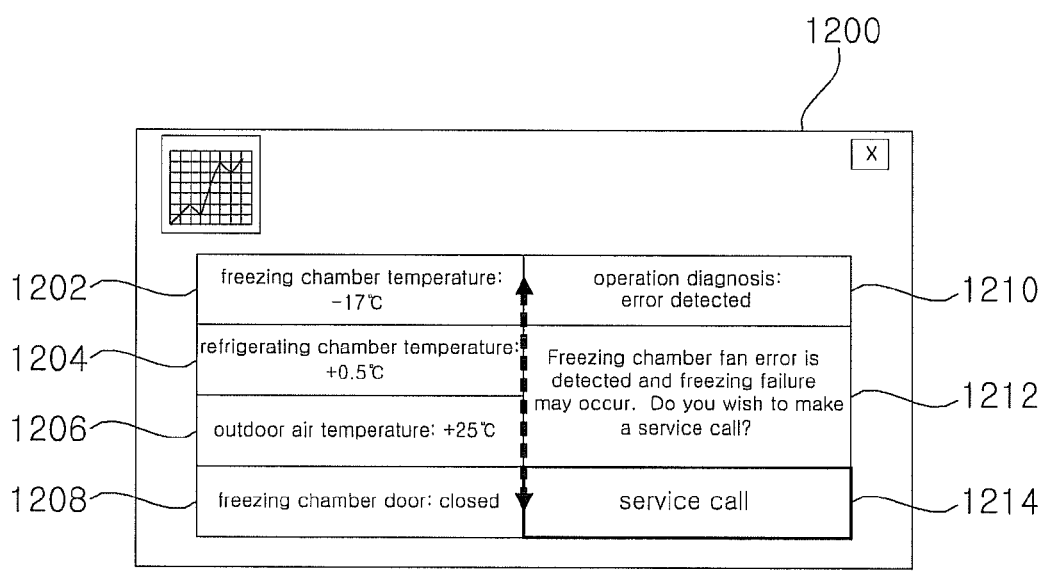
Figure 15:
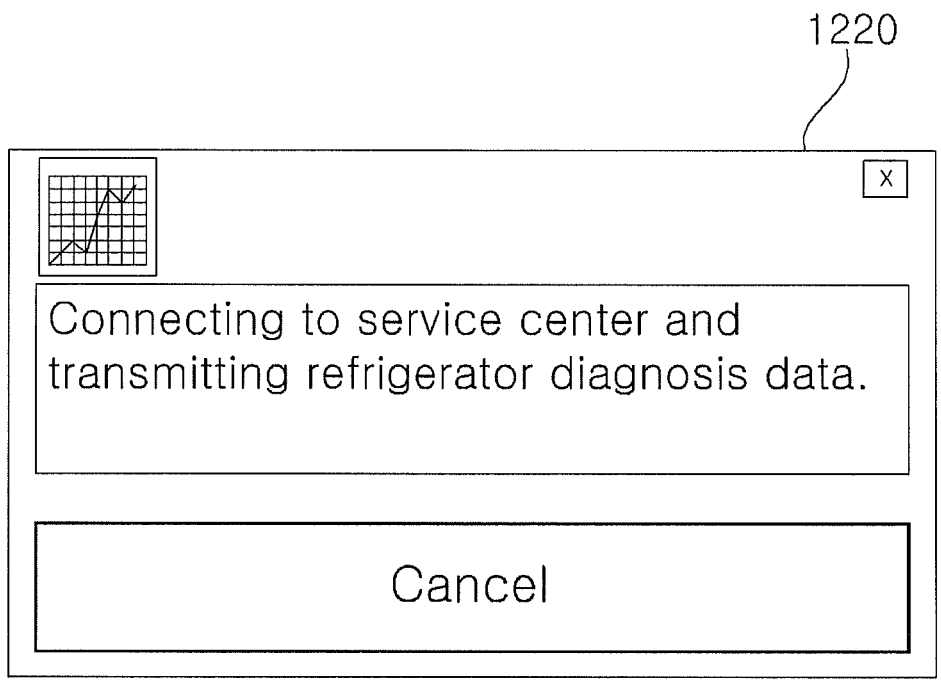
Figure 16:
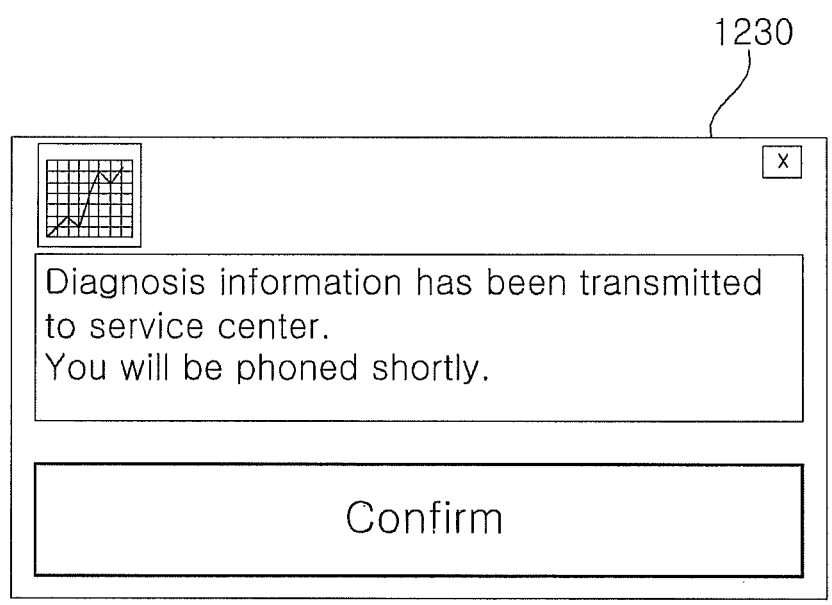

FIG. 5 is a flow chart illustrating a method for monitoring a refrigerator using a mobile terminal, according to one embodiment of the present invention. Also, FIG. 14 illustrates a monitoring picture according to the present invention. FIG. 15 illustrates a service center connection state picture according to the present invention. FIG. 16 illustrates a diagnosis information transmission completion picture according to the present invention.

Referring to FIG. 5, the mobile terminal displays the initial menu picture 700 shown in FIG. 7 (S302).

Also, the mobile terminal determines whether the monitoring item is selected (S304), and displays a monitoring picture 1200 as shown in FIG. 14 if the monitoring item is selected (S306). At this time, the monitoring picture 1200 may include freezing chamber temperature information 1202, refrigerating chamber temperature information 1204, outdoor air temperature information 1206, freezing chamber door opening/closing information 1208, operation diagnosis information 1210, error content information 1212 and a service call item 1214.

Also, the mobile terminal determines whether the service call item is selected (S308), and, if the service call item is selected, makes a connection to a service center server and transmits refrigerator diagnosis data to the service center server (S310).

On the other hand, the mobile terminal displays a service center connection state picture 1220 as shown in FIG. 15 (S312). Thereafter, if the refrigerator diagnosis data transmission is completed, the mobile terminal may display a diagnosis information transmission completion picture 1230 as shown in FIG. 16.

Figure 17:
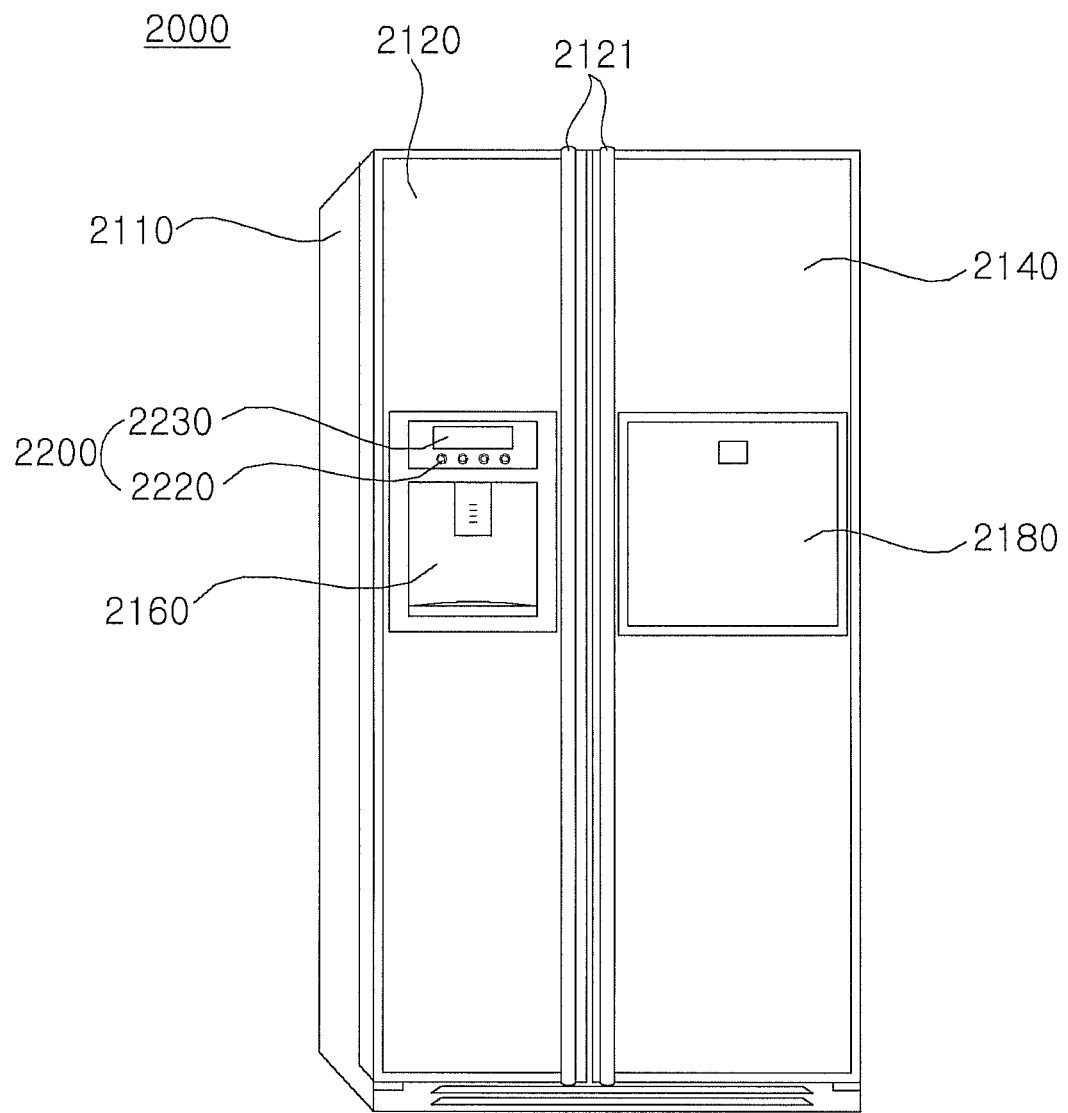
FIG. 17 is a perspective view showing the outer appearance of a refrigerator according to an exemplary embodiment of the present invention.

FIG. 17 is a perspective view showing the outer appearance of a refrigerator according to an exemplary embodiment of the present invention.

Referring to FIG. 17, a refrigerator 2000 according to an exemplary embodiment of the present invention has an outer appearance schematically formed by a case 2110 having an internal space partitioned into a freezing chamber and a refrigerating chamber, a freezing chamber door 2120 for shielding the freezing chamber, and a refrigerating chamber door 2140 for shielding the refrigerating chamber.

Door handles 2121 are provided at front surfaces of the freezing chamber door 2120 and refrigerating chamber door 2140 in such a manner that they are forwardly protruded from the front surfaces. The user may readily grasp the door handles 2121 to pivot the freezing chamber door 2120 and refrigerating chamber door 2140.

On the other hand, a home bar 2180, for convenience, may further be provided at the front surface of the refrigerating chamber door 2140 to enable the user to remove a food stored in the refrigerating chamber, such as a beverage, without opening the refrigerating chamber door 2140.

A dispenser 2160, for convenience, may further be provided at the front surface of the freezing chamber door 2120 to enable the user to easily take out ice or water without opening the freezing chamber door 2120. A control panel 2200 may be provided at an upper side of the dispenser 2160 to control a driving operation of the refrigerator 2000 and display the state of the refrigerator 2000 in operation on a screen.

The control panel 2200 may include an input unit 2220 consisting of a plurality of buttons, and a display unit 2230 for displaying a control picture, an operating state, etc.

The display unit 2230 displays a control picture, an operating state, and information such as an internal temperature of the refrigerator. For example, the display unit 2230 may display a service type (cubed ice, water, crushed ice or the like) of the dispenser, a set temperature of the freezing chamber, and a set temperature of the refrigerating chamber.

This display unit 2230 may be implemented in various forms including a liquid crystal display (LCD), a light emitting diode (LED) display, and an organic light emitting diode (OLED) display. Also, the display unit 2230 may be implemented in the form of a touch screen that can also perform the function of the input unit 2220.

The input unit 2220 may include a plurality of manipulating buttons. For example, the input unit 2220 may include a dispenser setting button (not shown) for setting a service type (cubed ice, water, crushed ice or the like) of the dispenser, a freezing chamber temperature setting button (not shown) for setting the temperature of the freezing chamber, and a refrigerating chamber temperature setting button (not shown) for setting the temperature of the refrigerating chamber.

Here, it will be understood that the refrigerator according to the present embodiment is not limited to a double door type shown in FIG. 17, but may be applied to any type including a one door type, a sliding door type, and a curtain door type.

Figure 18:
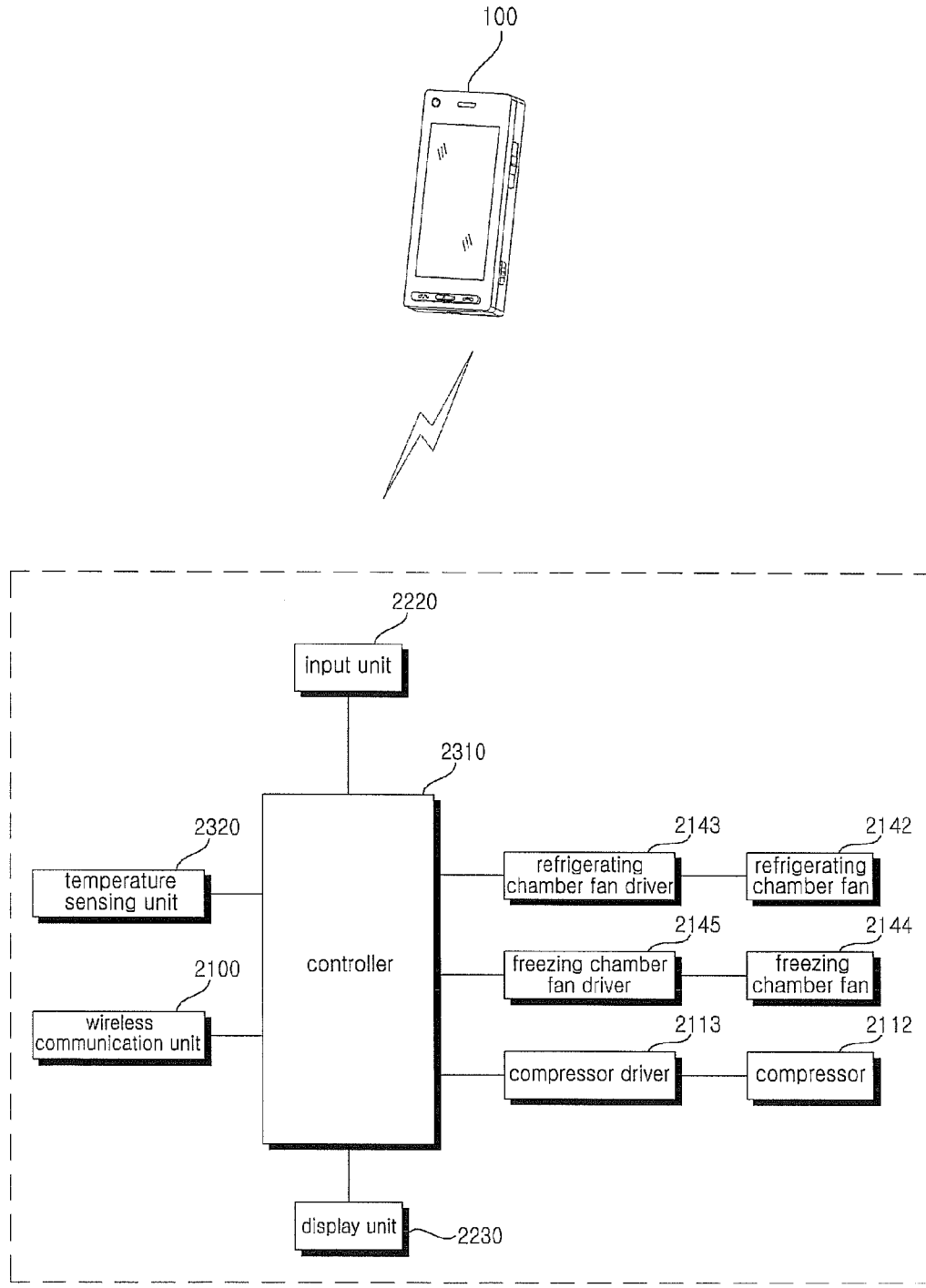
FIG. 18 is a block diagram showing an internal configuration of the refrigerator of FIG. 17.

FIG. 18 is a block diagram showing an internal configuration of the refrigerator of FIG. 17.

Referring to FIG. 18, the refrigerator further includes, internally, a wireless communication unit 2100, a controller 2310, a temperature sensing unit 2320, a compressor 2112, a compressor driver 2113, a refrigerating chamber fan 2142, a refrigerating chamber fan driver 2143, a freezing chamber fan 2144, and a freezing chamber fan driver 2145.

The compressor 2112, compressor driver 2113, refrigerating chamber fan 2142, refrigerating chamber fan driver 2143, freezing chamber fan 2144, freezing chamber fan driver 2145 and temperature sensing unit 2320 generally operate for air conditioning within the refrigerating chamber or freezing chamber of the refrigerator, as well known in the art, and a description thereof will thus be omitted.

The wireless communication unit 2100 transmits/receives data to/from the mobile terminal 100.

The wireless communication unit 2100 transmits state information of the refrigerator, more particularly information about kinds, expiration dates and storage periods of foods stored in the refrigerator. Also, the wireless communication unit 2100 may transmit freezing chamber temperature information, refrigerating chamber temperature information, outdoor air temperature information, door opening/closing information, operation diagnosis information, error content information, etc.

Also, the wireless communication unit 2100 receives a refrigerator control signal from the mobile terminal 100. The refrigerator control signal may be, for example, a control signal for setting of a refrigerating chamber temperature, a freezing chamber temperature or the like, which may correspond to the above-stated remote control item of the mobile terminal 100. Also, the wireless communication unit 2100 may receive refrigerator management software from the mobile terminal 100.

The controller 2310 controls the operation of the wireless communication unit 2100. For example, the controller 2310 may control transmission of state information of the refrigerator including food related information, freezing chamber temperature information and refrigerating chamber temperature information. Also, the controller 2310 may perform a control operation corresponding to a received refrigerator control signal. Meanwhile, in the case where refrigerator management software is received, the controller 2310 may perform upgrade based on the received refrigerator management software.

In this manner, it is possible to simply and conveniently control the refrigerator using the mobile terminal 100.

On the other hand, the refrigerator may further include a camera unit (not shown) for acquiring images of foods stored in the refrigerator. The acquired images may be transmitted to the mobile terminal 100 through the wireless communication unit 2100 together with corresponding food information.

As is apparent from the above description, according to the present invention, it is possible to readily determine the state of a refrigerator using a mobile terminal. Also, it is possible to simply control the refrigerator using the mobile terminal.

In detail, in order to know which foods there is a shortage of in the refrigerator at any place or time, it is possible to display information about foods stored in the refrigerator including kinds and freshness degrees of the stored foods using the mobile terminal.

Moreover, in the case where an error occurs in the refrigerator, the mobile terminal may make a connection to a service center server in real time to transmit refrigerator diagnosis data to the service center server, and display a service center connection state picture.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A refrigerator comprising:
    a case having an internal space partitioned into a freezing chamber and a refrigerating chamber;
    a freezing chamber door and a refrigerating chamber door;
    a compressor;
    a compressor driver to drive the compressor; and
    a first wireless communication unit to exchange data with a mobile terminal,
    wherein the mobile terminal includes
    a second wireless communication unit configured to receive state information of a refrigerator and to transmit a control signal based on a control operation to the refrigerator when a remote control item in a refrigerator management menu is selected,
    a display configured to display the state information of the refrigerator, and
    a controller configured to control the display to display information associated with food stored in the refrigerator on the screen when a food management item in the refrigerator management menu is selected, and
    wherein when the food information is displayed, the display displays a list of time periods on a first area of the display and displays one or more food images on a second area of the display.

2. The refrigerator according to claim 1, wherein the first wireless communication unit transmits the state information to the mobile terminal and receives the control signal from the mobile terminal.

3. The refrigerator according to claim 2, wherein the state information includes information about kinds, expiration dates and storage periods of foods stored in the refrigerator.

4. The refrigerator according to claim 2, wherein the first wireless communication unit of the refrigerator further transmits at least one of freezing chamber temperature information, refrigerating chamber temperature information, outdoor air temperature information, door opening/closing information, operation diagnosis information, or error content information.

5. The refrigerator according to claim 1, wherein the mobile terminal includes a camera configured to acquire images of the foods stored in the refrigerator, wherein the controller generates the food information using the acquired food images.

6. The refrigerator according to claim 1, wherein the controller controls the display to display the refrigerator management menu, the refrigerator management menu including at least one of the food management item, a monitoring item, a software upgrade item, or the remote control item.

7. The refrigerator according to claim 1, wherein when a time period item in the list of periods is selected, the display displays the selected food image and food information associated with the selected food image, wherein the food information includes one or more of a name, current date, storage date, elapsed period, expiration date, or barcode information.

8. The refrigerator according to claim 1, wherein, when any one of the food images in the second area is selected, the controller controls the display to display the selected food image, food information concerning the selected food image, and a delete button, and wherein, when the delete button is selected, the controller deletes the food information concerning the selected food image.

9. The refrigerator according to claim 1, wherein the controller arranges a plurality of foods in order according to expiration date or storage period,
   the display displays the list of time periods on the first area and displays one or more food images arranged corresponding to a prescribed time period in the second area.

10. The refrigerator according to claim 1, wherein the mobile terminal includes an audio output module configured to output an audio signal processed by the mobile terminal,
   wherein the second wireless communication unit of the mobile terminal including
   a GPS module that receives location information, and
   a mobile communication module that transmits and receives voice call signals.

* * * * *